US012566716B2

(12) United States Patent
Joseph et al.

(10) Patent No.: US 12,566,716 B2
(45) Date of Patent: *Mar. 3, 2026

(54) SYSTEMS AND METHODS FOR TIMESTEP SHARED MEMORY MULTIPROCESSING BASED ON TRACKING TABLE MECHANISMS

(71) Applicant: Samsung Electronics Co., Ltd., Suwon-si (KR)

(72) Inventors: Douglas Joseph, Austin, TX (US); Thomas Labonte, Marlborough, MA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/786,416

(22) Filed: Jul. 26, 2024

(65) Prior Publication Data

US 2025/0307175 A1 Oct. 2, 2025

Related U.S. Application Data

(60) Provisional application No. 63/571,431, filed on Mar. 28, 2024.

(51) Int. Cl.
*G06F 12/1072* (2016.01)

(52) U.S. Cl.
CPC .... *G06F 12/1072* (2013.01); *G06F 2212/622* (2013.01)

(58) Field of Classification Search
None
See application file for complete search history.

(56) References Cited

U.S. PATENT DOCUMENTS

| | | | | |
|---|---|---|---|---|
| 9,619,398 | B1 * | 4/2017 | Xu | G06F 12/109 |
| 10,482,129 | B1 * | 11/2019 | Blott | G06F 3/0604 |
| 11,288,252 | B2 | 3/2022 | Kimura | |
| 11,556,482 | B1 * | 1/2023 | Hunt | G06F 12/1045 |
| 11,868,348 | B2 | 1/2024 | Chavan et al. | |
| 11,921,722 | B2 | 3/2024 | Chavan et al. | |
| 2016/0291891 | A1 * | 10/2016 | Cheriton | G06F 3/064 |
| 2017/0046304 | A1 * | 2/2017 | Chen | H04L 67/1097 |

(Continued)

FOREIGN PATENT DOCUMENTS

CN 113836366 A 12/2021

*Primary Examiner* — Yaima Rigol
(74) *Attorney, Agent, or Firm* — Renaissance IP Law Group LLP

(57) ABSTRACT

Provided are systems, methods, and apparatuses for timestep shared memory multiprocessing based on tracking table mechanisms. In one or more examples, the systems, devices, and methods include determining a first node writes application data to a memory, obtaining a data address of the memory associated with the application data, and generating an index of the data address based on hashing the data address in a hash function. In one or more examples, the systems, devices, and methods include generating a tracking entry based on the first node writing application data to the memory, storing the index and the tracking entry in a bucket of a hash table, and detecting an access violation to the application data based on the tracking entry indicating a node other than the first node modifies the application data.

20 Claims, 14 Drawing Sheets

(56)        References Cited

U.S. PATENT DOCUMENTS

| 2020/0233760 A1* | 7/2020 | Wu ..................... G06F 11/2056 |
| 2021/0124686 A1* | 4/2021 | Kamran .............. G06F 12/1408 |
| 2021/0294785 A1 | 9/2021 | Jang et al. |
| 2024/0007276 A1* | 1/2024 | Piller ................... H04L 9/0852 |
| 2024/0028243 A1 | 1/2024 | Nowatzyk et al. |

* cited by examiner

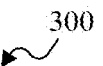
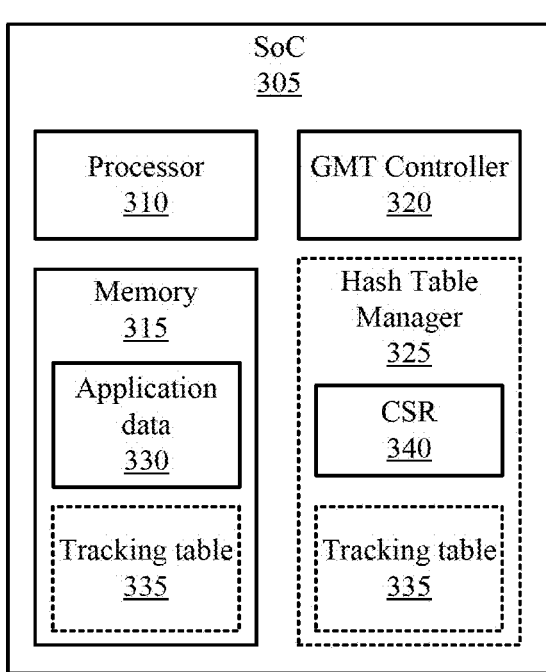
FIG. 3

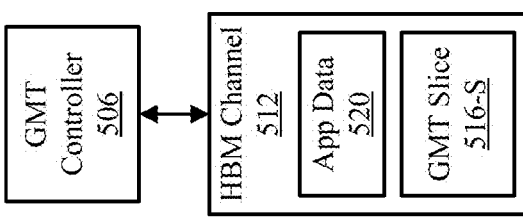
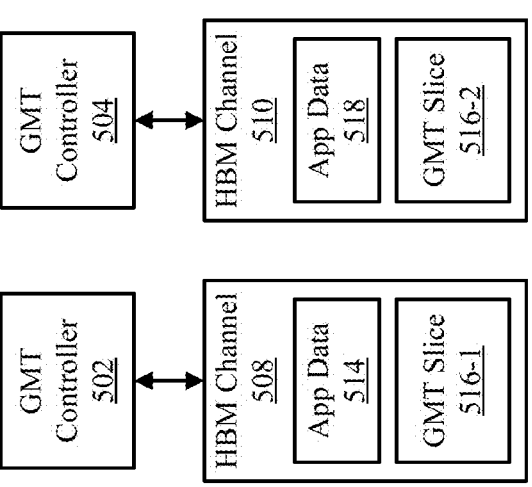
FIG. 5

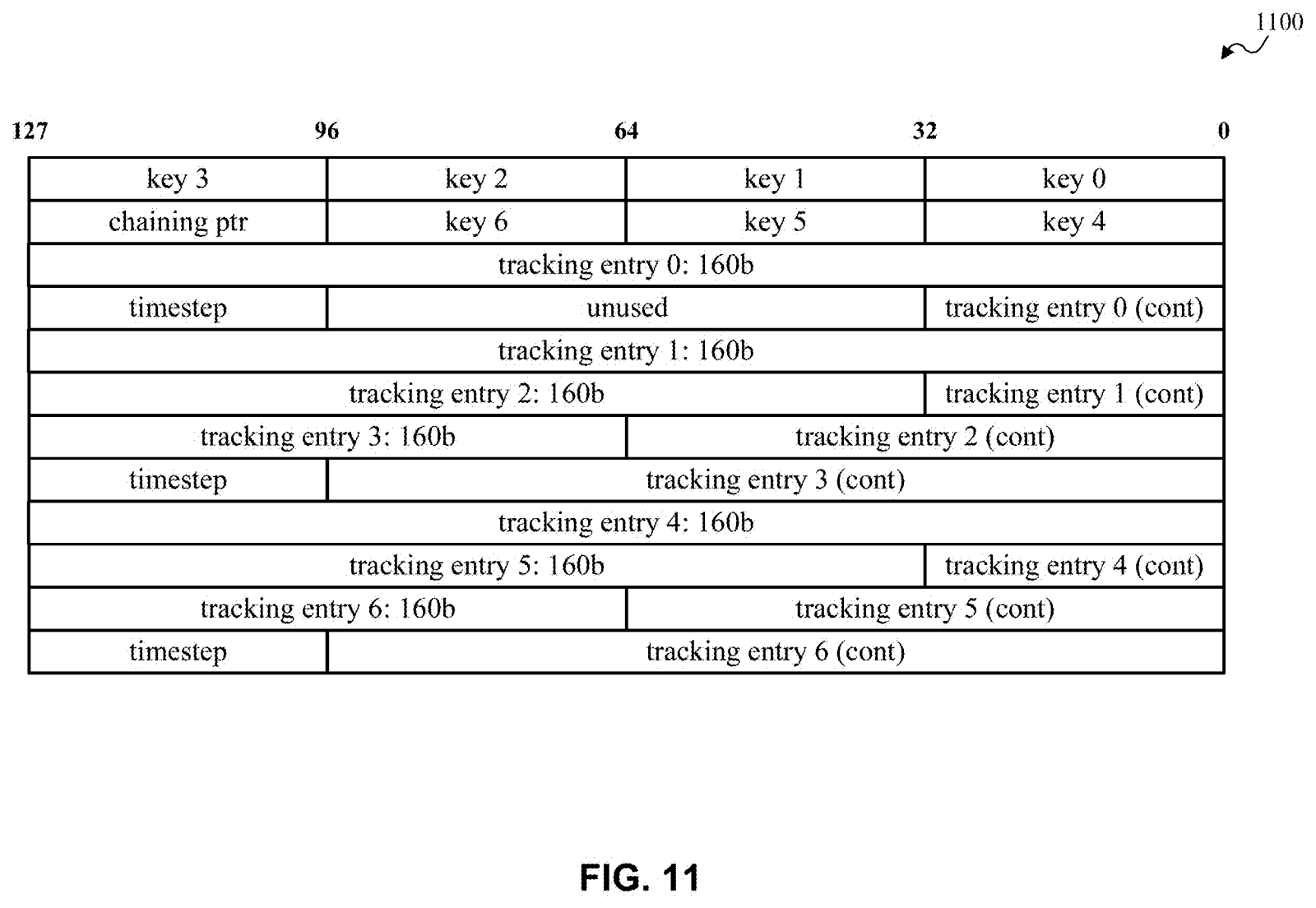

| 0 | 32 | 64 | 96 | 127 |
|---|---|---|---|---|
| key 0 | key 1 | key 2 | key 3 | |
| key 4 | key 5 | key 6 | chaining ptr | |
| tracking entry 0: 160b | | | | |
| tracking entry 0 (cont) | unused | timestep | | |
| tracking entry 1: 160b | | | | |
| tracking entry 1 (cont) | | | | |
| tracking entry 2 (cont) | tracking entry 2: 160b | | | |
| tracking entry 3 (cont) | tracking entry 3: 160b | | | |
| | timestep | | | |
| tracking entry 4: 160b | | | | |
| tracking entry 4 (cont) | tracking entry 5: 160b | | | |
| tracking entry 5 (cont) | tracking entry 5: 160b | timestep | | |
| tracking entry 6 (cont) | tracking entry 6: 160b | | | |
| | timestep | | | |

FIG. 11

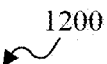
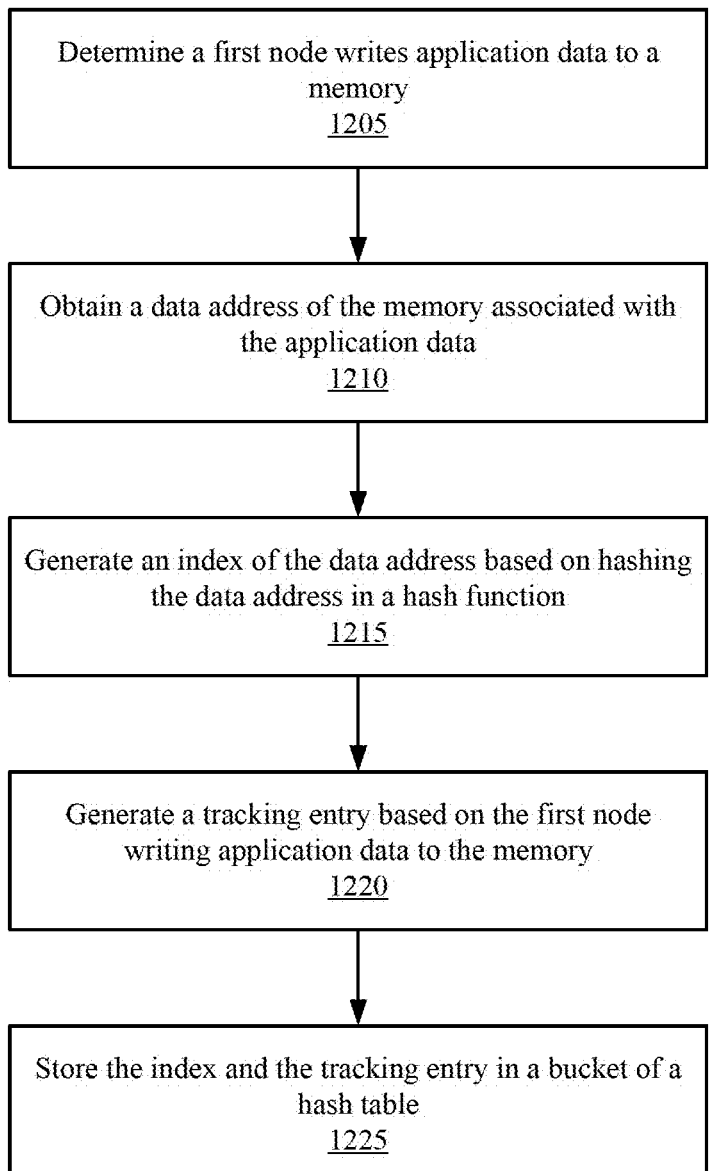
FIG. 12

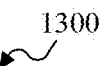

1300

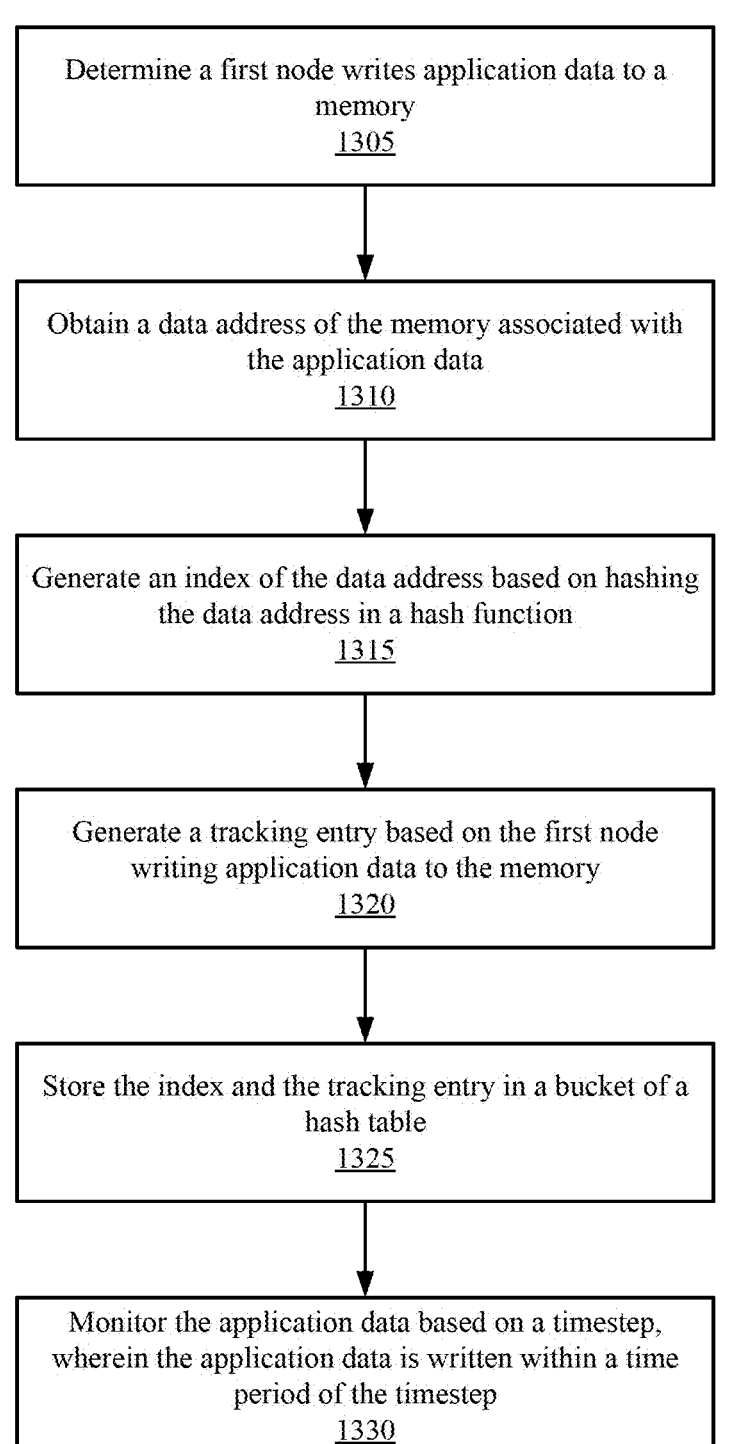

Determine a first node writes application data to a
memory
1305

↓

Obtain a data address of the memory associated with
the application data
1310

↓

Generate an index of the data address based on hashing
the data address in a hash function
1315

↓

Generate a tracking entry based on the first node
writing application data to the memory
1320

↓

Store the index and the tracking entry in a bucket of a
hash table
1325

↓

Monitor the application data based on a timestep,
wherein the application data is written within a time
period of the timestep
1330

FIG. 13

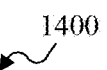

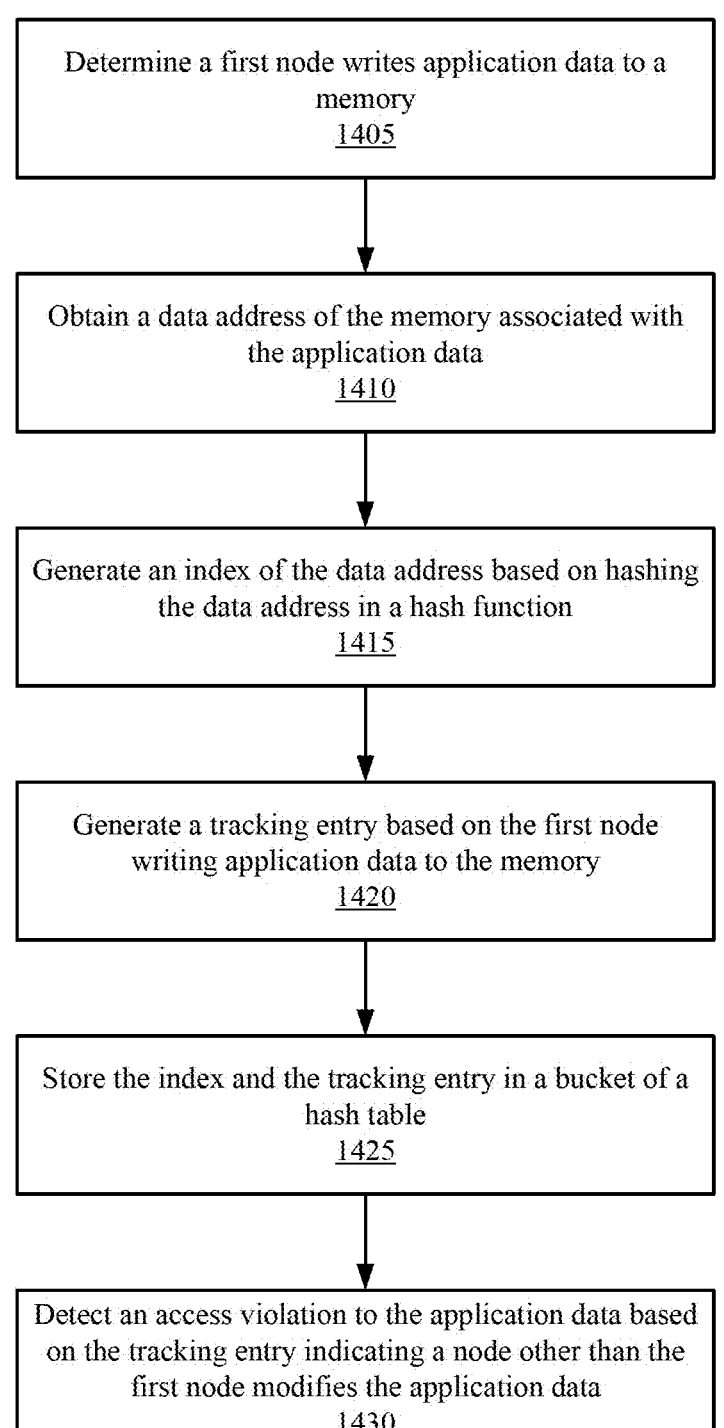

1400

Determine a first node writes application data to a
memory
1405

Obtain a data address of the memory associated with
the application data
1410

Generate an index of the data address based on hashing
the data address in a hash function
1415

Generate a tracking entry based on the first node
writing application data to the memory
1420

Store the index and the tracking entry in a bucket of a
hash table
1425

Detect an access violation to the application data based
on the tracking entry indicating a node other than the
first node modifies the application data
1430

FIG. 14

SYSTEMS AND METHODS FOR TIMESTEP SHARED MEMORY MULTIPROCESSING BASED ON TRACKING TABLE MECHANISMS

CROSS-REFERENCE TO RELATED APPLICATIONS

This application claims the benefit of U.S. Provisional Patent Application Ser. No. 63/571,431 Mar. 28, 2024, which is incorporated by reference herein for all purposes.

TECHNICAL FIELD

The disclosure relates generally to memory systems. In particular, the subject matter relates to systems and methods for timestep shared memory multiprocessing based on tracking table mechanisms.

BACKGROUND

The present background section is intended to provide context only, and the disclosure of any concept in this section does not constitute an admission that said concept is prior art. Shared memory multiprocessing (SMP) can include a computer architecture where multiple processors share resources and work together to distribute a processing workload. With SMP, multiple processors can share a common operating system (OS) and memory, and have access to all input and output devices. The processors can share the same input/output (I/O) bus or data path, and may be controlled by a single copy of the OS. SMP can be implemented in supercomputing and big data systems. The balance of resources can enable SMP systems to efficiently use resources and perform parallel processing tasks. SMP systems can dynamically balance workloads among computers to serve more users faster.

SUMMARY

In various embodiments, the systems and methods described herein include systems, methods, and apparatuses for timestep shared memory multiprocessing based on tracking table mechanisms. In some aspects, the systems and methods described herein relate to a method including: determining a first node writes application data to a memory; obtaining a data address of the memory associated with the application data; generating an index of the data address based on hashing the data address in a hash function; generating a tracking entry based on the first node writing application data to the memory; storing the index and the tracking entry in a bucket of a hash table; and detecting an access violation to the application data based on the tracking entry indicating a node other than the first node modifies the application data.

In some aspects, the techniques described herein relate to a method, wherein the tracking entry includes an identifier of the first node, indicating the first node wrote the application data to the memory.

In some aspects, the techniques described herein relate to a method, further including monitoring the application data based on a timestep, wherein the application data is written within a time period of the timestep.

In some aspects, the techniques described herein relate to a method, further including detecting, based on the tracking entry, an access violation when a node other than the first node modifies the application data during the timestep.

In some aspects, the techniques described herein relate to a method, wherein the application data includes floating point data of a force, a velocity, an acceleration, or a position of an object.

In some aspects, the techniques described herein relate to a method, wherein: the memory is a memory of a system on chip (SoC), the SoC including the first node or a second node different from the first node, and the data address is obtained from a logical circuit of the SoC.

In some aspects, the techniques described herein relate to a method, further including storing a write pointer to a first configuration status register, the write pointer pointing to a next available bucket of the hash table.

In some aspects, the techniques described herein relate to a method, further including: storing a start of allocation to a second configuration status register; and storing an end of allocation to a third configuration status register, wherein the start of allocation points to a starting bucket of the hash table and the end of allocation point to an ending bucket of the hash table.

In some aspects, the techniques described herein relate to a method, further including adding a collision heap allocation based on determining a fill threshold of the hash table is satisfied.

In some aspects, the techniques described herein relate to a method, further including: identifying a collision associated with a second bucket of the hash table; storing a second index and a second tracking entry in a bucket of the collision heap allocation; and linking the second bucket of the hash table to the bucket of the collision heap allocation.

In some aspects, the techniques described herein relate to a device including: a memory; and at least one processor coupled with the memory configured to: determine a first node writes application data to the memory; obtain a data address of the memory associated with the application data; generate an index of the data address based on hashing the data address in a hash function; generate a tracking entry based on the first node writing application data to the memory; and store the index and the tracking entry in a bucket of a hash table.

In some aspects, the techniques described herein relate to a device, wherein the tracking entry includes an identifier of the first node, indicating the first node wrote the application data to the memory.

In some aspects, the techniques described herein relate to a device, wherein the at least one processor is configured to monitor the application data based on a timestep, wherein the application data is written within a time period of the timestep.

In some aspects, the techniques described herein relate to a device, wherein the at least one processor is configured to detect, based on the tracking entry, an access violation when a node other than the first node modifies the application data during the timestep.

In some aspects, the techniques described herein relate to a device, wherein the application data includes floating point data of a force, a velocity, an acceleration, or a position of an object.

In some aspects, the techniques described herein relate to a device, wherein: the memory is a memory of a system on chip (SoC), the SoC including the first node or a second node different from the first node, and the data address is obtained from a logical circuit of the SoC.

In some aspects, the techniques described herein relate to a device, wherein the at least one processor is configured to store a write pointer to a first configuration status register, the write pointer pointing to a next available bucket of the hash table.

In some aspects, the techniques described herein relate to a non-transitory computer-readable medium storing code that includes instructions executable by a processor of a system on chip (SoC) to: determine a first node writes application data to a memory; obtain a data address of the memory associated with the application data; generate an index of the data address based on hashing the data address in a hash function; generate a tracking entry based on the first node writing application data to the memory; and store the index and the tracking entry in a bucket of a hash table.

In some aspects, the techniques described herein relate to a non-transitory computer-readable medium, wherein the tracking entry includes an identifier of the first node, indicating the first node wrote the application data to the memory.

In some aspects, the techniques described herein relate to a non-transitory computer-readable medium, wherein the code includes further instructions executable by the processor to cause the SoC to monitor the application data based on a timestep, wherein the application data is written within a time period of the timestep.

A computer-readable medium is disclosed. The computer-readable medium can store instructions that, when executed by a computer, cause the computer to perform substantially the same or similar operations as described herein are further disclosed. Similarly, non-transitory computer-readable media, devices, and systems for performing substantially the same or similar operations as described herein are further disclosed.

The systems and methods described herein include multiple advantages and benefits. For example, techniques of tracking table mechanisms for timestep shared memory multiprocessing described herein include multiple advantages and benefits. For example, the systems and methods provide flexibility to adapt to applications on-demand. The systems and methods minimize chaining and latency.

BRIEF DESCRIPTION OF THE DRAWINGS

The above-mentioned aspects and other aspects of the present systems and methods will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

FIG. 3 illustrates an example system in accordance with one or more implementations as described herein.

FIG. 5 illustrates an example system in accordance with one or more implementations as described herein.

FIG. 6 illustrates an example tracking table in accordance with one or more implementations as described herein.

FIG. 11 illustrates an example data structure in accordance with one or more implementations as described herein.

FIG. 12 depicts a flow diagram illustrating an example method associated with the disclosed systems, in accordance with example implementations described herein.

FIG. 13 depicts a flow diagram illustrating an example method associated with the disclosed systems, in accordance with example implementations described herein.

FIG. 14 depicts a flow diagram illustrating an example method associated with the disclosed systems, in accordance with example implementations described herein.

Figure 1:
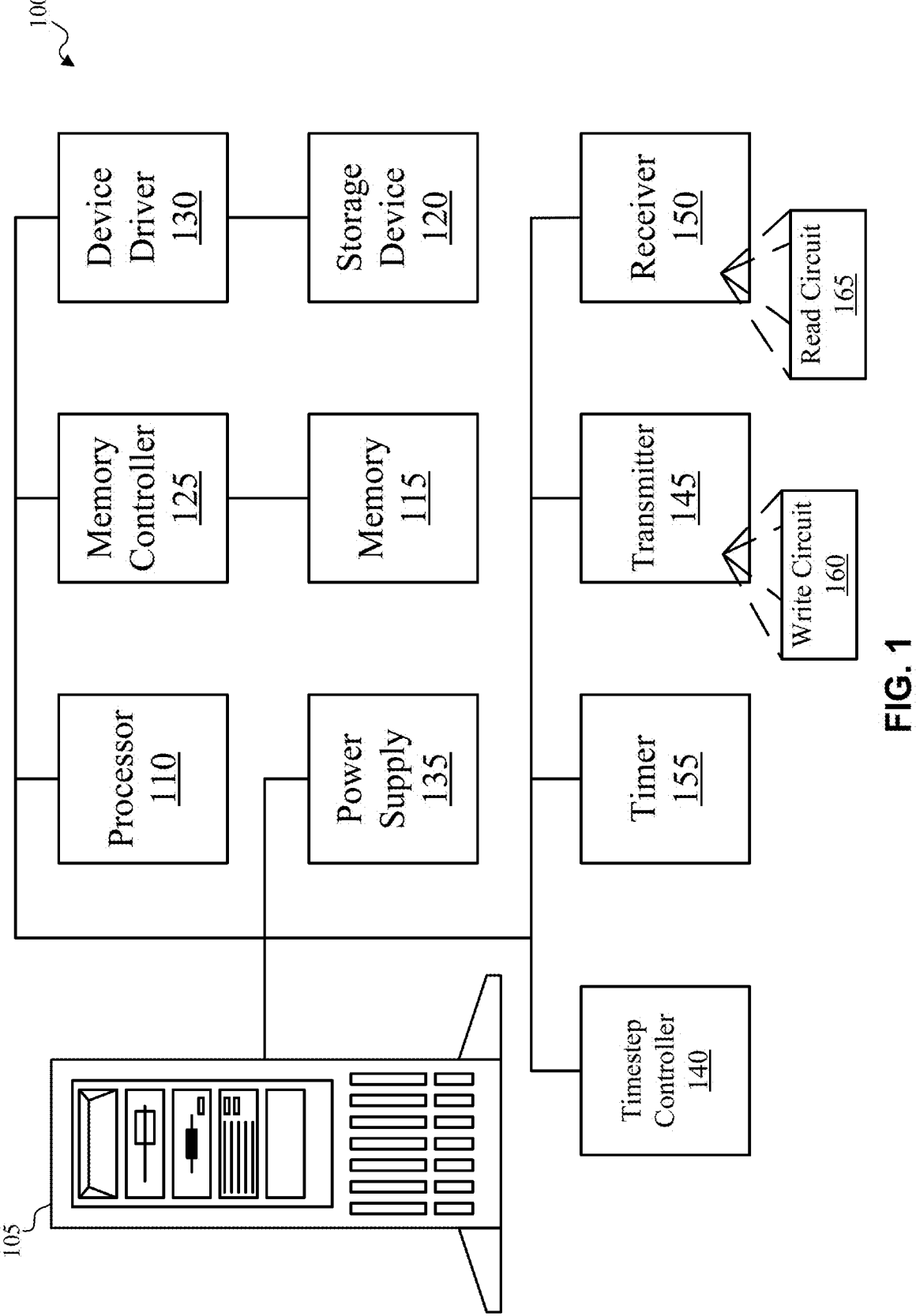
FIG. 1 illustrates an example system in accordance with one or more implementations as described herein.

While the present systems and methods are susceptible to various modifications and alternative forms, specific embodiments thereof are shown by way of example in the drawings and will herein be described. The drawings may not be to scale. It should be understood, however, that the drawings and detailed description thereto are not intended to limit the present systems and methods to the particular form disclosed, but to the contrary, the intention is to cover all modifications, equivalents, and alternatives falling within the spirit and scope of the present systems and methods as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/ or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially, such that one instruction is retrieved, loaded, and executed at a time. In some example embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on chip (SoC), an assembly, and so forth.

The following description is presented to enable one of ordinary skill in the art to make and use the subject matter disclosed herein and to incorporate it in the context of particular applications. While the following is directed to specific examples, other and further examples may be devised without departing from the basic scope thereof.

Various modifications, as well as a variety of uses in different applications, will be readily apparent to those skilled in the art, and the general principles defined herein may be applied to a wide range of embodiments. Thus, the subject matter disclosed herein is not intended to be limited to the embodiments presented, but is to be accorded the widest scope consistent with the principles and novel features disclosed herein.

In the description provided, numerous specific details are set forth in order to provide a more thorough understanding of the subject matter disclosed herein. It will, however, be apparent to one skilled in the art that the subject matter disclosed herein may be practiced without necessarily being limited to these specific details. In other instances, well-known structures and devices are shown in block diagram form, rather than in detail, in order to avoid obscuring the subject matter disclosed herein.

All the features disclosed in this specification (e.g., any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described herein with reference to the figures. It should be noted that the figures are only intended to facilitate the description of the features. The various features described are not intended as an exhaustive description of the subject matter disclosed herein or as a limitation on the scope of the subject matter disclosed herein. Additionally, an illustrated example need not have all the aspects or advantages shown. An aspect or an advantage described in conjunction with a particular example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

It is noted that, if used, the labels left, right, front, back, top, bottom, forward, reverse, clockwise and counterclockwise have been used for convenience purposes only and are not intended to imply any particular fixed direction. Instead, the labels are used to reflect relative locations and/or directions between various portions of an object.

Any data processing may include data buffering, aligning incoming data from multiple communication lanes, forward error correction ("FEC"), and/or others. For example, data may be first received by an analog front end (AFE), which prepares the incoming for digital processing. The digital portion (e.g., DSPs) of the transceivers may provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range may be interpreted as being approximate, as if the word "about" or "approximately" preceded the value of the value or range. Signals and corresponding nodes or ports might be referred to by the same name and are interchangeable for purposes here.

While embodiments may have been described with respect to circuit functions, the embodiments of the subject matter disclosed herein are not limited. Possible implementations may be embodied in a single integrated circuit, a multi-chip module, a single card, system-on-a-chip, or a multi-card circuit pack. As would be apparent to one skilled in the art, the various embodiments might also be implemented as part of a larger system. Such embodiments may be employed in conjunction with, for example, a digital signal processor, microcontroller, field-programmable gate array, application-specific integrated circuit, or general-purpose computer.

As would be apparent to one skilled in the art, various functions of circuit elements may also be implemented as processing blocks in a software program. Such software may be employed in, for example, a digital signal processor, microcontroller, or general-purpose computer. Such software may be embodied in the form of program code embodied in tangible media, such as magnetic recording media, optical recording media, solid-state memory, floppy diskettes, CD-ROMs, hard drives, or any other non-transitory machine-readable storage medium, that when the program code is loaded into and executed by a machine, such as a computer, the machine becomes an apparatus for practicing the subject matter disclosed herein. When implemented on a general-purpose processor, the program code segments combine with the processor to provide a unique device that operates analogously to specific logic circuits. Described embodiments may also be manifest in the form of a bit stream or other sequence of signal values electrically or optically transmitted through a medium, stored magnetic-field variations in a magnetic recording medium, etc., generated using a method and/or an apparatus as described herein.

A system on a chip (SoC) can be a single integrated circuit (IC) that contains all the electronic circuits for a fully functional system. SoCs can be different from traditional devices and computer architectures, where a separate chip or component is used for the central processing unit (CPU), graphics processing unit (GPU), random-access memory (RAM), storage, network controller, etc. Instead, SoCs combine many or all of an electronic device's function elements onto a single chip. SoCs help simplify circuit board design, resulting in improved power and speed without compromising system functionality. The integration of all the desired components on a single chip comes with multiple advantages in power efficiency, system latency, etc.

The systems and methods described herein may implement high bandwidth memory (HBM). HBM can include a type of computer memory that provides relatively high memory bandwidth and relatively low power consumption. HBM can use 3D stacking technology to pack memory chips into a relatively small space, reducing the distance data travels between memory and processor. HBM can include relatively wide communication lanes and vertically stacked memory chips connected by microscopic wires called through-silicon vias (TSVs). HBM may be used in high-performance computing applications with relatively fast data speeds, such as artificial intelligence/machine learning (AI/ML), data analytics, modeling, etc. HBM may be used in high-performance graphics accelerators, network devices, supercomputers, and the like.

The systems and methods described herein may implement metadata. Metadata can include a set of data that provides information about other data (e.g., representative data, data represented by the metadata), such as the content, quality, condition, and/or other characteristics of the representative data. Thus, metadata can be considered data about data. Metadata can provide context about data using information such as filename, definition, format, owner, and/or relationships to other data sets. Metadata can include metrics about an organization's data, such as data quality. Metadata can summarize information about data, making it easier to find and work with particular instances of data. For example, metadata for an image file might include the camera make, lenses used, time at which the picture was taken, focal length, and/or GPS coordinates of the location. Metadata can specify how a data object can be handled when the data object is accessed. Metadata can include standardized, structured information that makes the metadata easier to find, understand, use, and manage the representative data.

The systems and methods may implement one or more configuration status registers (CSRs). CSRs may be referred to as a register map and may be found in CPUs, microcontrollers, I/O devices, and the like. CSRs may be read from and/or written to using a set of instructions that allow devices to perform various combinations of reading and writing, setting and clearing bits, etc., in relation to the CSRs.

The systems and methods described herein may implement global shared memory. Global shared memory can enable communication between processors without the need for message-passing libraries. Global shared memory can provide an efficient way for threads to work together by sharing their intermediate results and input data. In some cases, global memory can be the main memory space that is used to share data between a processor and host. For example, global shared memory is at least a portion of memory that is shared between a host and processor. Global shared memory can be accessible to all threads, where any thread can read and write to any location of the global memory. In some examples, shared memory is separate for each block, and any thread of a block can read and write to the shared memory of that block. In some cases, global shared memory may be shared among all processors in a given system. The processors may be independent, bootable devices (e.g., without a host processor attached to manage them).

The systems and methods described herein may implement a hash table. A hash table can be a data structure that maps keys to values. A hash table may use a hash function to compute an index value that holds the elements to be searched, inserted, and/or removed. A hash table may be referred to as a hash map or a hash set. In some cases, a hash table may implement an associative array (e.g., dictionary), which can be an abstract data type that maps keys to values. A hash table can use a hash function to compute an index, also called a hash code, into an array of buckets or slots, from which the desired value can be found. During lookup, the key may be hashed and the resulting hash may indicate where the corresponding value is stored. In some cases, the hash function may assign each key to a unique bucket, but some hash table designs can employ an imperfect hash function, which might cause hash collisions where the hash function generates the same index for more than one key. Such collisions can be accommodated (e.g., based on a collision heap). In a well-dimensioned hash table, the average time complexity for each lookup can be independent of the number of elements stored in the table. Some hash table designs can allow arbitrary insertions and deletions of key-value pairs (e.g., at amortized constant average cost per operation).

The systems and methods described herein may implement associativity in a hash table, which can refer to the use of an associative bucket approach, which can help maintain the hash table's performance as load factors increase. In some cases, associativity may be based on cuckoo hashing, which can include a computer programming mechanism for resolving hash collisions of values of hash functions in a table, with worst-case constant lookup time. The name derives from the behavior of some species of cuckoo, where the cuckoo chick pushes the other eggs or young out of the nest when it hatches in a variation of the behavior referred to as brood parasitism; analogously, inserting a new key into a cuckoo hashing table may push an older key to a different location in the table. An associative array can store a set of (key, value) pairs and allow insertion, deletion, and lookup (search), with the constraint of unique keys. In the hash table implementation of associative arrays, an array A of length m may be partially filled with n elements, where m≥n. A value x can get stored at an index location A[h(x)], where h is a hash function, and h(x)<m.

The systems and methods described herein may implement pointers. A pointer can be a variable that stores the memory address of another variable or data structure, rather than storing the data itself. Pointers may be used for allocating new objects on a heap, passing functions to other functions, dynamic memory allocation, etc. A chaining pointer can be a pointer that points to a bucket, which may contain a chaining pointer that points to another bucket, and so on. For example, a first chaining pointer may include the address of a bucket, which may include a valid chaining pointer containing the address of a second bucket, which may contain a valid chaining pointer to a third bucket, etc.

The systems and methods described herein may implement one or more chaining pointers (e.g., links). A chaining pointer can be a pointer to a next entry in a linked list. In a hash table, each bucket can be a linked list of entries with the same hash value. The chaining pointer for a bucket can point to the first entry in the linked list. When an entry is inserted into a hash table, the hash value of the key can be calculated. The entry can be added to the linked list for the bucket with that hash value. To find an entry in a hash table, the hash value of the key can be calculated and then the chaining pointer can be followed for the bucket with that hash value until the entry is found or the end of the linked list is reached. Chaining pointers can be used in hash tables to resolve collisions. A collision may occur when two keys have the same hash value. When a collision occurs, the new entry can be added to the linked list for the bucket with that hash value. There can be multiple entries in a bucket with the same hash value. Chaining pointers can allow hash tables to store multiple entries with the same hash value, which makes hash tables more efficient.

The systems and methods described herein may implement data structures that are byte aligned. Byte aligned can mean that a memory address is a multiple of n, where n is a power of 2. A byte can be the smallest unit of memory access, so each memory address can specify a different byte. For example, an object that is 8 bytes aligned can be stored at a memory address that is 8 bytes wide. A memory access can be said to be aligned when the data being accessed is n bytes long and the datum address is n-byte aligned. When a memory access is not aligned, it can be said to be mis-aligned.

The systems and methods described herein may implement data compression. Data compression can include the process of encoding, restructuring, or modifying data to reduce its size (e.g., by using fewer bits than the original representation). Data compression can help save storage capacity, speed up file transfer, and lower the cost of storage hardware and network bandwidth. Bit packing can include a data compression technique that uses bit-sized headers and more compact forms of values. Bit packed can be used for streaming data, for reading values as a string of bits, for writing values as a string of bits, for writing bit-sized headers, for using a variable-length header, etc.

In some approaches, timestep shared memory multi-processing can include SoCs tracking which words in a memory block have been written by which SoCs (e.g., recording node IDs for each word). Each memory block can have associated metadata, record this information and have the metadata stored separately. In some cases, the metadata may be tracked in each SoC for the slice of Global Shared Memory that it owns. The tracking information can consume memory. The resizable tracking table can expand and contract as needed. In some approaches, the definition of timestep SMP does not describe details of the tracking table and the nature of the hashing and sizing. In the systems and methods described herein, a configurable table and mechanisms are provided to track this metadata. The systems and methods described herein can incorporate timestep shared memory multiprocessing (TSMP) and/or can be generalizable as a reconfigurable hardware-based hash table. Some approaches may not implement TSMP. In some examples, the systems and methods described herein provide a resizable, hybrid open hash table managed by hardware with software intervention for memory allocation.

The systems and methods described herein may be implemented in a system where data is configured to be preserved for at least the duration of a timestep. For example, the systems and methods may enable data to be analyzed over specified time intervals (e.g., timesteps). In some cases, timestep shared memory multiprocessing enables a system to analyze different states over different intervals of time. In some cases, timesteps may be defined by one or more parameters. The one or more parameters may include a time interval, a time step repeat interval, and/or a reference time. In some cases, the time interval defines the duration of a step being analyzed. The time step repeat interval may indicate how often the interval is measured. The reference time may reference a point in time that enables the time interval and time step repeat interval to align, with time steps continuing forward and/or backward from that point.

In some cases, the systems and methods described herein may be implemented in relation to physical aspects of one or more objects. For example, the systems and methods described herein may be implemented in relation to force, velocity, acceleration, position, etc., of an object (e.g., of an atom, molecule, etc.). In some examples, the systems and methods may be implemented in relation to molecular activation. Molecular activation can include when a molecule absorbs energy through radiation and becomes activated. Molecular activation can allow a molecule to undergo chemical reactions that are not normally present in thermal equilibrium.

In one or more examples, the systems and methods may include run-time re-configurable table structure (direct-mapped table or hashed table). The systems and methods may include using a hybrid open hash table to track modified word data (e.g., application data). The systems and methods may include a primary hash table, bucket format, and/or chaining structure that are reconfigurable between timesteps. In some cases, timestep SMP allows discarding of metadata between timesteps. The systems and methods may include dynamically upsizing a collision heap at run-time, in between timesteps. In some cases, hardware may notify software to provide an additional heap allocation. The systems and methods may include a distributed primary table, and shared collision heap. A combination of hardware and software may be used to manage the tracking table.

The systems and methods may include multiple writers of application data (global memory tracking table (GMT) controllers) and a single, central hash table manager. The systems and methods may include hash table telemetry registers for evaluation by software. The systems and methods may include a threshold to trigger a new heap allocation. In some cases, the tracking table may be associated with global shared memory, where the tracking table may be referred to as a global memory tracking table (GMT). In some cases, the tracking table may be used by system hardware for recording modified-word metadata as it arrives on-demand from nodes (e.g., remote nodes). In some cases, the tracking table may be configurable by software and/or managed by hardware. The tracking table may include one or more hash table buckets. In some cases, a hash table bucket (e.g., each hash table bucket) may be configured as a fully-associative array of tracking entries to minimize chaining and latency. In some cases, hardware of the systems and methods may be configured to use one or more hash table sizes, one or more bucket layouts, associativity, and hash chaining organizations.

The techniques described herein include logic to provide tracking table mechanisms for timestep shared memory multiprocessing. The logic includes any combination of hardware (e.g., at least one memory, at least one processor), logical circuitry, firmware, and/or software to provide tracking table mechanisms for timestep shared memory multiprocessing. Examples of tracking table logic described herein can include GMT controller logic and/or central hash table manager (HTM) logic.

FIG. 1 illustrates an example system 100 in accordance with one or more implementations as described herein. In FIG. 1, machine 105, which may be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. It is noted that processor 110, along with the other components discussed below, are shown outside the machine for ease of illustration: embodiments of the disclosure may include these components within the machine. While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may include volatile and/or non-volatile memory. Memory 115 may use any desired form factor: for example, Single In-Line Memory Module (SIMM), Dual In-Line Memory Module (DIMM), Non-Volatile DIMM (NVDIMM), etc. Memory 115 may be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may support an operating system under which various applications may be running. These applications may issue requests (which may be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol, a Serial Attached Small Computer System Interface (SCSI) (SAS) protocol, or a Serial AT Attachment (SATA) protocol. Storage device 120 may include any desired interface, including, for example, a Peripheral Component Interconnect Express (PCIe) interface, or a Compute Express Link (CXL) interface. Storage device 120 may take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

While FIG. 1 uses the term "storage device," embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices. In some cases, the term "storage unit" may encompass storage device 120 and memory 115. Machine 105 may include power supply 135. Power supply 135 may provide power to machine 105 and its components.

Machine 105 may include transmitter 145 and receiver 150. Transmitter 145 or receiver 150 may be respectively used to transmit or receive data. In some cases, transmitter 145 and/or receiver 150 may be used to communicate with memory 115 and/or storage device 120. Transmitter 145 may include write circuit 160, which may be used to write data into storage, such as a register, in memory 115 and/or storage device 120. In a similar manner, receiver 150 may include read circuit 165, which may be used to read data from storage, such as a register, from memory 115 and/or storage device 120. In the illustrated example, machine 105 may include timer 155. Timer 155 may be used to initiate a timestep, monitor a timestep, determine when a timestep lapses or expires, determine an age of data, track an age of data, determine when data expires, etc.

In one or more examples, machine 105 may be implemented with any type of apparatus. Machine 105 may be configured as (e.g., as a host of) one or more of a server such as a compute server, a storage server, storage node, a network server, a supercomputer, data center system, and/or the like, or any combination thereof. Additionally, or alternatively, machine 105 may be configured as (e.g., as a host of) one or more of a computer such as a workstation, a personal computer, a tablet, a smartphone, and/or the like, or any combination thereof. Machine 105 may be implemented with any type of apparatus that may be configured as a device including, for example, an accelerator device, a storage device, a network device, a memory expansion and/or buffer device, a central processing unit (CPU), a graphics processing unit (GPU), a neural processing unit (NPU), a tensor processing unit (TPU), optical processing units (OPU), and/or the like, or any combination thereof.

Any communication between devices including machine 105 (e.g., host, computational storage device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (Open-CAPI), Cache Coherent Interconnect for Accelerators (CCIX), Advanced eXtensible Interface (AXI) and/or the like, or any combination thereof, Transmission Control Protocol/Internet Protocol (TCP/IP), FibreChannel, Infini-Band, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, system 100 may include one or more additional apparatus having one or more additional communication interfaces.

Any of the functionality described herein, including any of the host functionality, device functionally, timestep controller 140 functionality, and/or the like, may be implemented with hardware, software, firmware, or any combination thereof including, for example, hardware and/or software combinational logic, sequential logic, timers, counters, registers, state machines, volatile memories such as at least one of or any combination of the following: dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), GPUs, NPUs, TPUs, OPUs, and/or the like, executing instructions stored in any type of memory. In some embodiments, one or more components of timestep controller 140 may be implemented as an SoC.

In some examples, timestep controller 140 may include any one or combination of logic (e.g., logical circuit), hardware (e.g., processing unit, memory, storage), software, firmware, and the like. In some cases, timestep controller 140 may perform one or more functions in conjunction with processor 110. In some cases, at least a portion of timestep controller 140 may be implemented in or by processor 110 and/or memory 115. The one or more logic circuits of timestep controller 140 may include any one or combination of multiplexers, registers, logic gates, arithmetic logic units (ALUs), cache, computer memory, microprocessors, processing units (CPUs, GPUs, NPUs, and/or TPUs), FPGAs, ASICs, etc., that enable timestep controller 140 to provide systems and methods for timestep shared memory multiprocessing based on tracking table mechanisms.

In one or more examples, timestep controller 140 may include at least a portion of, be at least partially incorporated within, and/or operate in conjunction with a global memory tracking table (GMT). Additionally, or alternatively, timestep controller 140 may include at least a portion of, be at least partially incorporated within, and/or operate in conjunction with a hash table manager (HTM).

In one or more examples, timestep controller 140 may write data to a memory of an SoC (e.g., high-bandwidth memory). In some cases, timestep controller 140 may allow Node 0 to write data to a memory controlled by timestep controller 140. For example, timestep controller 140 may receive requests to write to this memory and timestep controller 140 may determine whether to allow the request to proceed. In some cases, the data may include physical aspects of an object (e.g., force, velocity, acceleration, position of an atom or molecule). In some examples, timestep controller 140 may obtain a memory address of the memory where the data is written. Implementations may include timestep controller 140 generating an index based on hashing the memory address. In some cases, timestep controller 140 may write the memory address to a bucket of a hash table (e.g., to entry 0 of bucket 0 of a primary hash table). In some cases, timestep controller 140 may generate a tracking entry that indicates Node 0 wrote the data to the memory controlled by timestep controller 140. In some examples, timestep controller 140 may store the tracking entry and the memory address together to the bucket of the hash table (e.g., to entry 0 of bucket 0 of the primary hash table).

In one or more examples, any other node writing the same memory may cause an access violation. For example, any two nodes writing the same memory within a timestep may cause an access violation. In some examples, timestep controller 140 may detect an access violation when a first node (e.g., Node 0) writes to memory controlled by timestep controller 140 and then a second node (e.g., a node other than Node 0) modifies the data written to this memory. For example, for a given timestep (e.g., duration of time), timestep controller 140 may monitor the data written to the memory by a first node and determine whether a second node modifies the data written to the memory during the timestep. When timestep controller 140 determines a node other than the first node modifies the data written by the first node to the memory during the timestep, timestep controller 140 may generate a notification indicating the occurrence of the access violation.

Figure 2:
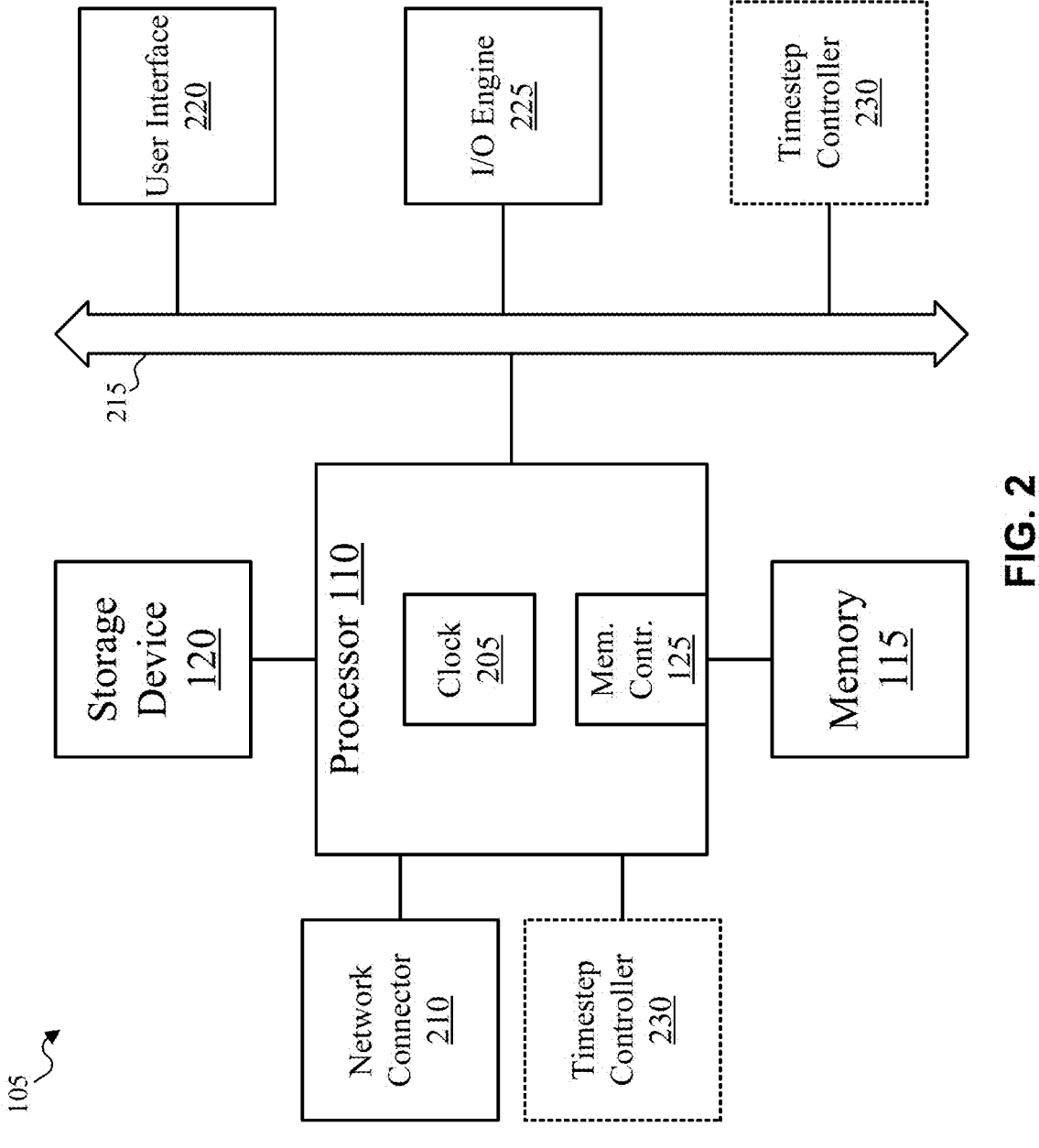
FIG. 2 illustrates details of the system of FIG. 1, according to one or more implementations as described herein.

FIG. 2 illustrates details of machine 105 of FIG. 1, according to examples described herein. In the illustrated example, machine 105 may include one or more processors 110, which may include memory controllers 125 and clocks 205, which may be used to coordinate the operations of the components of the machine. Processors 110 may be coupled to memories 115, which may include random access memory (RAM), read-only memory (ROM), or other state preserving media, as examples. Processors 110 may be coupled to storage devices 120, and to network connector 210, which may be, for example, an Ethernet connector or a wireless connector. Processors 110 may be connected to buses 215, to which may be attached user interfaces 220 and Input/Output (I/O) interface ports that may be managed using I/O engines 225, among other components. As shown, processors 110 may be coupled to timestep controller 230, which may be an example of timestep controller 140 of FIG. 1. Additionally, or alternatively, processors 110 may be connected to buses 215, to which may be attached timestep controller 230.

FIG. 3 illustrates an example system 300 in accordance with one or more implementations as described herein. In the illustrated example, system 300 may include at least one SoC (e.g., SoC 305). In some examples, SoC 305 may be an SoC in a system with one or more SoCs. In some cases, SoC 305 may be an example of at least one of the one or more SoCs in system 300. In some aspects, system 300 may include and/or be implemented in supercomputing, cloud computing, big data systems, datacenters, servers, storage devices, network devices, computing devices, and/or virtualization systems.

In the illustrated example, SoC 305 may include processor 310, memory 315, one or more global memory tracking table (GMT) controllers (e.g., GMT controller 320), and one or more hash table managers (e.g., hash table manager 325). As shown, memory 315 may include application data 330. In some cases, memory 315 may include one or more tracking tables (e.g., tracking table 335). As shown, hash table manager 325 may include at least one configuration status register (e.g., CSR 340). Additionally, or alternatively, hash table manager 325 may include one or more tracking tables (e.g., tracking table 335). In some examples, memory 315 may include a physical instance of tracking table 335 stored in a physically addressable location of memory 315. In some cases, hash table manager 325 may include a logical instance of tracking table 335 stored in a logically addressable location of hash table manager 325. In some cases, hash table manager 325 may include a memory that stores a physical instance of tracking table 335 stored in a physically addressable location of the memory of hash table manager 325.

CSR 340 may include one or more registers in a processing unit (e.g., processor 310, a processor or microcontroller of hash table manager 325, etc.). CSR 340 may enable a device (e.g., SoC 305, hash table manager 325, and/or a node or SoC external to SoC 305) to write status information, read status information, and/or change information stored in CSR 340.

In some cases, GMT controller 320 and/or hash table manager 325 may include at least one processing unit (e.g., CPU, GPU, FPGA, ASIC, logical circuitry). In some cases, GMT controller 320 and/or hash table manager 325 may include at least one memory module (e.g., HBM, DRAM, SRAM, etc.). In some cases, GMT controller 320 and/or hash table manager 325 may include at least a portion of, be at least partially incorporated within, and/or operate in conjunction with processor 310. In some cases, GMT controller 320 and/or hash table manager 325 may include at least a portion of, be at least partially incorporated within, and/or operate in conjunction with memory 315.

The systems and methods described herein apply to any system that computes in timesteps. In some examples, the physical aspects of the one or more objects may be analyzed and saved as application data (e.g., application data 330). For example, application data 330 may include a force associated with an object (e.g., atom or molecule), a velocity associated with the object, an acceleration associated with the object, and/or a position (e.g., lattice points) associated with the object. In some cases, application data 330 may include floating point data with one or more floating point precisions (e.g., 16-bit floating point precision, 32-bit floating point precision, 64-bit floating point precision, 128-bit floating point precision, 256-bit floating point precision, etc.).

A given node (e.g., SoC 305) may be enabled to write to memory 315 and/or memory of one or more nodes (e.g., SoCs) of system 300. The systems and methods are configured to minimize application data 330 being changed during a given timestep. The systems and methods enable a given system (e.g., system 300) to detect data access violations in relation to application data 330 based on tracking information (e.g., tracking entries, tracking metadata) that identifies a node that authorized to write application data to a given memory (e.g., memory 315, global shared memory). In some cases, the tracking information (e.g., metadata) may be stored separately from application data 330. In some cases, the tracking information may include a node identifier of the node that wrote application data 330.

The systems and methods may enable a system to identify when an unauthorized node (e.g., SoC) accesses and/or modifies application data 330. For instance, a first node may be authorized to write or authorize a second node to write at least a portion of application data 330 to a portion or slice of global shared memory (e.g., portion of global memory, memory 315) associated with the first node. The systems and methods may enable a given system to detect when a third node accesses/modifies the portion of application data 330 written to the portion of memory associated with the first node, determine that the third node is not authorized to access/modify the portion of application data 330, and generate a notification indicating the access violation. In some cases, the systems and methods may monitor for access violations based on a software contract that is implemented by a given system (e.g., system 300, SoCs of system 300 including SoC 305, etc.).

In some examples, tracking table 335 may include at least one reconfigurable hybrid open hash table. In some cases, tracking table 335 may include at least a primary hash table. In some implementations, tracking table 335 may include at least one collision heap (e.g., in addition to a primary hash table). In some cases, tracking table 335 may be referred to as a global memory tracking table (GMT).

Tracking table 335 may be associated with global shared memory (e.g., memory 315), or a common memory space that multiple users can access on a computer or workstation. Although depicted within hash table manager 325, at least a portion of tracking table 335 may be stored in memory 315 (e.g., in high-bandwidth memory). In some cases, tracking table 335 may be referred to as a global memory tracking table (GMT). Tracking table 335 may be used by system hardware (e.g., hardware of system 300, SoC 305, hardware of SoC 305) for recording modified-word metadata as it arrives on-demand from remote nodes (e.g., remote SoCs), from local nodes (e.g., local SoCs), and/or a home node (e.g., SoC 305).

In some implementations, a home node (e.g., SoC 305) may be configured as the gatekeeper of a slice of global shared memory (GSM). In some cases, memory 315 may include one or more slices of GSM, or may be a slice of GSM. In some cases, a remote node may request the home node to allow the remote node to write to the slice of GSM allocated or controlled by the home node. In some cases, each node of a given system (e.g., SoCs of system 300, including SoC 305) may be allocated a slice of GSM. For example, a first slice may be allocated to SoC 305, a second slice to a second SoC, a third slice to a third SoC, etc. Accordingly, a remote node may request SoC 305 to allow the remote node to write to the slice of GSM allocated or controlled by SoC 305. Additionally, or alternatively, SoC 305 may request a remote node to allow SoC 305 to write to the slice of GSM allocated or controlled by the remote node.

In some examples, one or more aspects of system 300 (e.g., tracking table 335) may be configurable by software and/or managed by hardware (e.g., of SoC 305). Tracking table 335 may include one or more hash table buckets. In some cases, a hash table bucket (e.g., each hash table bucket) may be configured as a fully-associative array of tracking entries to minimize chaining and latency. In some cases, hardware of system 300 (e.g., SoC 305) may be configured to use one or more hash table sizes, one or more bucket layouts, one or more associativity configurations, and/or one or more hash chaining configurations. For example, tracking table 335 may include a first hash table of a first size and a second hash table of a second size the same as or different from the first size.

In some examples, tracking table 335 may be configured as a direct-mapped table that implements reserving a maximum space for tracking all of global shared memory (GSM) of a given system (e.g., system 300). In some cases, SoC 305 may be configured to transition between a direct-mapped table and open hash table between timesteps, as directed by a host (e.g., operating system, software application, etc.). In some cases, SoC 305 may implement resizability in relation to memory 315. For example, SoC 305 may implement resizability in relation to memory 315 configured as and/or included in global shared memory (GSM). In some cases, resizability can provide adaptation to application behavior with regards to GSM. In some cases, SoC 305 may be configured to discard tracking information between timesteps, enabling streamlined table reconfiguration between timesteps.

In some examples, tracking table 335 can be configured by software to cover a local node's slice of GSM (e.g., all of the local node's slice of GSM) as a direct-mapped table, rather than a hash. Smaller sizes implemented as a hash table can be used with the expectation that not all of GSM will be written, (e.g., based on application). Between timesteps, software can change a hardware configuration between direct-mapped and hashed tables. In some cases, in relation to the change to the hardware configuration, an old state may be zeroed out from the new table.

Figure 4:
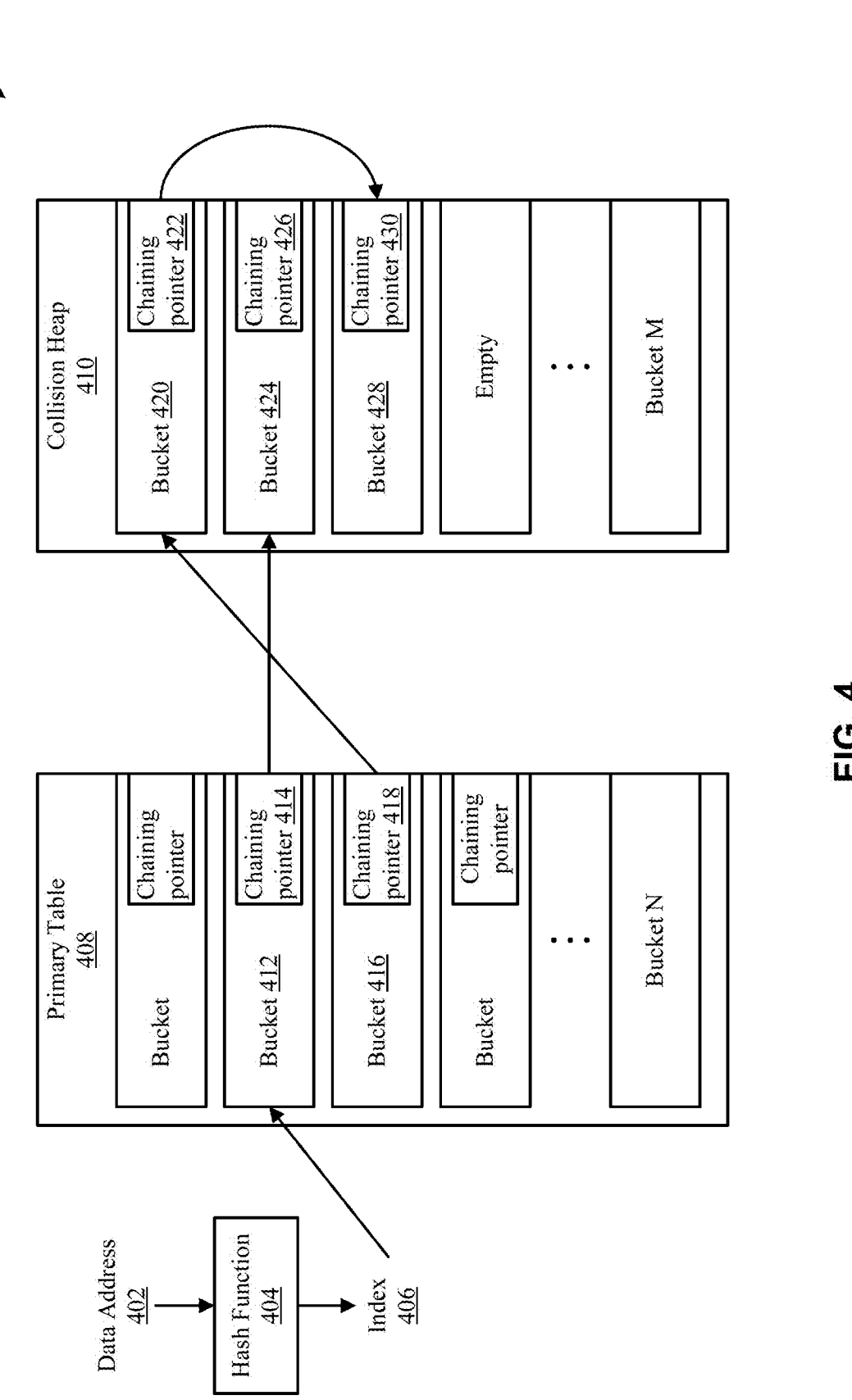
FIG. 4 illustrates an example tracking table in accordance with one or more implementations as described herein.

FIG. 4 illustrates an example tracking table 400 in accordance with one or more implementations as described herein. In some cases, tracking table 400 may enable a system of tracking table mechanisms for timestep shared memory multiprocessing. In some cases, tracking table 400 may be an example of tracking table 335. In some cases, primary table 408 and/or collision heap 410 may be example of tracking table 335 of FIG. 3. In some cases, tracking table

335 may be referred to as a global memory tracking table (GMT). Thus, primary table 408 may be referred to as a primary GMT and/or collision heap 410 may be referred to as a GMT collision heap.

In the illustrated example, tracking table 400 includes primary table 408 and collision heap 410. Primary table 408 and/or collision heap 410 may include one or more buckets. Tracking table 400 illustrates hash tables using separate chaining (e.g., chaining with primary table 408 and chaining with collision heap 410). In some cases, the size (e.g., number of buckets) and format of primary table 408 may be configured at a start of an application (e.g., at a start of a timestep, at a start of an initial timestep of multiple timesteps, etc.). In some cases, the size and/or format of primary table 408 may be reconfigured between timesteps.

In some cases, a home node (e.g., SoC 305) may obtain a data address 402 (e.g., application address) associated with the home node writing application data to a memory of the home node or associated with a remote node writing application data to the memory of the home node (e.g., based on the home node granting a request of the remote node). As shown, the address of the application data (data address 402) may be hashed to determine the index into primary table 408. In the illustrated example, index 406 may be generated based on inputting data address 402 in hash function 404. In some cases, the home node (e.g., SoC 305, hash table manager 325, and/or processor 310) may input data address 402 in hash function 404. As shown, index 406 may be linked to bucket 412 of primary table 408. In some examples, the home node may store data address 402 in bucket 412 based on index 406.

As shown, primary table 408 may include N buckets, including bucket 412 with chaining pointer 414, bucket 416 with chaining pointer 418, and one or more empty buckets, where N is a positive integer (e.g., 10, 100, 500, 1000, etc.). Collision heap 410 may include M buckets, including bucket 420 with chaining pointer 422, bucket 424 with chaining pointer 426, bucket 428 with chaining pointer 430, and one or more empty buckets, where M is a positive integer (e.g., 10, 100, 500, 1000, etc.). Collision heap 410 may include the same, less, or more buckets than primary table 408 (e.g., N=M, N<M, M<N).

In some examples, one or more buckets may include a chaining pointer that points to another bucket of the same hash table or a different hash table. In the illustrated example, hash collisions in primary table 408 may be chained to locations in collision heap 410. As shown, bucket 412 of primary table 408 may include chaining pointer 414 that points to bucket 424 of collision heap 410; bucket 416 of primary table 408 may include chaining pointer 418 that points to bucket 420 of collision heap 410; bucket 420 of collision heap 410 may include chaining pointer 422 that points to bucket 428 of collision heap 410.

FIG. 5 illustrates an example system 500 in accordance with one or more implementations as described herein. In some cases, system 500 may include a system of tracking table mechanisms for timestep shared memory multiprocessing. As shown, system 500 may include one or more GMT controllers (e.g., GMT controller 502, GMT controller 504, up to GMT controller 506), and one or more memory channels (e.g., high-bandwidth (HBM) channel 508, HBM channel 510, up to HBM channel 512). In the illustrated example, the memory channels are depicted as HBM channels, but may be implemented with other types of memory channels. In some cases, the depicted HBM channels may be slices of global shared memory (e.g., global shared HBM).

As shown, an HBM channel may include application data and a slice of a primary hash table (e.g., slices of a primary GMT). For example, HBM channel 508 may include application data 514 and GMT slice 516-1; HBM channel 510 may include application data 517 and GMT slice 516-2; and HBM channel 512 may include application data 520 and GMT slice 516-S, where S is a positive integer. In some cases, S may be a power of two with non-negative exponents (e.g., 2, 4, 8, 16, 32, 64, 128 GMT slices, etc.). For example, a primary hash table may be divided into 16 slices, where a first slice is allocated to a first HBM channel of a first GMT controller, a second slice is allocated to a second HBM channel of a second GMT controller, and so on.

In some implementations, a primary hash table may be allocated in slices across memory controllers (e.g., GMT controllers, memory controllers, HBM controllers). For example, one contiguous physical allocation of a primary hash table may be interleaved across multiple controllers. In the illustrated example, a primary hash table (e.g., primary GMT) may be divided into S slices. Thus, in some cases, primary table 408 may depict one slice of the S slices of a global primary hash table. Alternatively, primary table 408 may depict one contiguous physical allocation of a primary hash table that is allocated across multiple GMT controllers.

In some examples, a host (e.g., operating system, software application) may allocate memory (e.g., global shared memory) for the primary hash table to span across all memory controllers (e.g., GMT controllers) of a given system. In some cases, a GMT controller (e.g., each GMT controller) may operate independently on its own slice of memory (e.g., slice of the primary hash table). In some cases, a GMT logic block (e.g., a depicted GMT controller) may work on a portion of the primary hash table within its own HBM channel. For example, GMT controller 502 may work on GMT slice 516-1 in HBM channel 508; GMT controller 504 may work on GMT slice 516-2 in HBM channel 510; and GMT controller 506 may work on GMT slice 516-S in HBM channel 512.

In some examples, a portion of the primary hash table (e.g., primary GMT) may be co-located with its associated application data in the same memory channel (e.g., same HBM memory channel). As shown, tracking entries of a primary hash table may be co-located with their associated application data in the same memory channel (e.g., HBM channel). For example, tracking entries of GMT slice 516-1 may be co-located with application data 514 in HBM channel 508; tracking entries of GMT slice 516-2 may be co-located with application data 518 in HBM channel 508; and tracking entries of GMT slice 516-S may be co-located with application data 520 in HBM channel 508.

Figure 6:
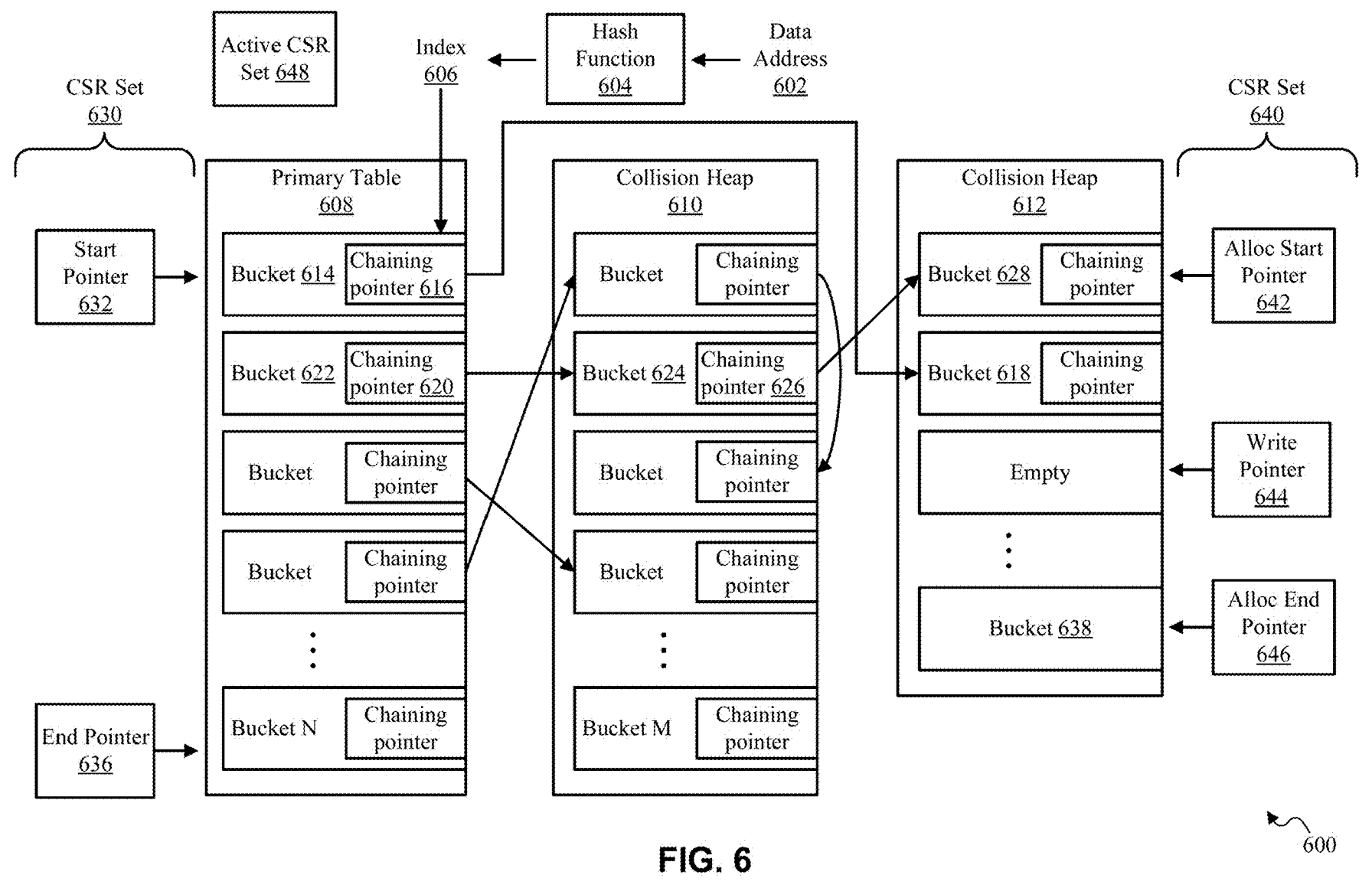

FIG. 6 illustrates an example tracking table 600 in accordance with one or more implementations as described herein. In some cases, tracking table 600 may enable a system of tracking table mechanisms for timestep shared memory multiprocessing. In some examples, tracking table 600 illustrates an expandable collision heap. In some cases, tracking table 600 may be an example of tracking table 335 and/or tracking table 400.

As shown, tracking table 600 may include primary table 608, collision heap 610, and collision heap 612. In the illustrated example, index 606 may be generated based on passing data address 602 through hash function 604. As shown, index 606 may be associated with bucket 614 of primary table 608. As shown, chaining pointers may be configured to point to buckets of collision heap 610 and/or collision heap 612. For example, chaining pointer 616 of bucket 614 may point to bucket 618 of collision heap 612;

chaining pointer 620 of bucket 622 may point to bucket 624 of collision heap 610; and chaining pointer 626 may point to bucket 628 of collision heap 612.

In some cases, hardware (e.g., SoC 305, hash table manager 325, GMT controller 320) may provide a system with a configuration indicating to use linear collision chains and/or collision trees. For a binary tree, each bucket of a hash table may include two collision pointers. Traversing a binary tree may be done using some set of the key's bits to steer the direction (e.g., different from the hash function). In some cases, trees wider than binary trees may be used (e.g., power of 2 branching).

In some examples, primary table 608, collision heap 610, and/or collision heap 612 may be associated with one or more configuration status registers (e.g., CSR 340). In some examples, the one or more CSRs (e.g., a set of CSRs) may be examples of CSR 340 of FIG. 3. In some cases, one or more CSRs may be associated with a hash table (e.g., primary table 608) or a collision heap (e.g., collision heap 610 or collision heap 612) based on where data is currently being written to. For example, when primary table 608 includes empty buckets and data is currently being written to primary table 608, then one or more CSRs (e.g., a set of CSRs) may be associated with primary table 608. When primary table 608 is filled and no empty buckets remain, then the one or more CSRs of a collision heap may be activated by an active CSR indicator (e.g., active CSR set 648), where the one or more CSRs may be configured to point to buckets of this collision heap, to where data is currently being written to that collision heap (e.g., collision heap 612).

CSR set 630 and/or CSR set 640 may include one or more registers. In the illustrated example, a set of CSRs (e.g., CSR set 630) may be associated with primary table 608. Also, a set of CSRs (e.g., CSR set 640) may be associated with collision heap 612. In some cases, another set of CSRs may be associated with collision heap 610. CSR set 630 and/or CSR set 640 may be an example of CSR 340 of FIG. 3. As shown, CSR set 630 may include a first status register (e.g., primary start pointer 632) that points to bucket 614 of primary table 608, indicating bucket 614 is the start of an allocation primary table 608 and a second status register (e.g., primary end pointer 636) that points to bucket N of primary table 608 (e.g., points to an end of an allocation of primary table 608). When data is being written to primary table 608, one bucket after another may be filled until the buckets of primary table 608 are filled. When the buckets of primary table 608 are filled, a hash table manager (e.g., hash table manager 325) may provide collision heap 610. When the buckets of collision heap 610 are filled, the hash table manager may provide collision heap 612.

It is noted that CSRs of a primary table (e.g., CSR set 630 of primary table 608) may be configured differently from CSRs of collision heaps (e.g., CSR set 640 of collision heap 612). For example, while CSRs of collision heaps (e.g., CSR set 640) may be part of selectable CSR sets based on the indication of active CSR set 648, CSR set 630 may not be part of a selectable CSR set. Unlike CSRs that point to collision heaps, CSRS of a primary table may be semi-permanent and may remain unchanged for at least a given timestep. As shown, primary start pointer 632 may indicate the start of primary table 608, and primary end pointer 636 may indicate the end of primary table 608 (e.g., for bounds checking). In some cases, a CSR set for a primary table may not include a write pointer. When an incoming address is hashed (e.g., data address 602 via hash function 604), the resulting index (e.g., index 606) may be added to the start of the primary table to find the primary bucket (e.g., bucket 614) for that index. In some cases, a given address may index (e.g., always index) to the same location in the primary table (e.g., index 606 always goes to bucket 614, a second index always goes to bucket 622, etc.). For collision heaps, buckets may be dynamically allocated as needed. In a given collision heap, an incoming address may end up in any bucket of the collision heap (e.g., depending on the order of arrival of other addresses before it).

In some examples, the number of buckets in primary table 608 may depend on the hash function being used (e.g., hash function 608). In some cases, a hash function may be based on using bits of the received application address (e.g., bits 8 through 15) as the index. In these examples, 8 bits of index may be used to uniquely identify one bucket in the primary table. With 8 bits of index, the primary table would have 256 buckets. In some cases, the address hash may be constant. When a GMT controller receives address 0x5AC0, the GMT controller may check bucket 0x5A first to see if the address is already there (e.g., using the full address recorded as the key in the bucket).

A data address received by system 600 (e.g., data address 602) may have the address 0x35A90. Using hashing function 604, index 606 indicates this address should be recorded in primary bucket 0x5A (e.g., bucket 614). Accordingly, a GMT controller may check bucket 0x5A to see if data address 0x35A90 has already been recorded there. As indicated above, in some cases, address 0x5AC0 is already written to bucket 0x5A, and the GMT controller determines that address 0x35A90 does not already exist in bucket 0x5A. Accordingly, the GMT controller determines where to store address 0x35A90. In some cases, bucket 0x5A may be configured to hold multiple entries, and if the GMT controller determines space (e.g., a slot in the bucket) is still available, the GMT controller may write address 0x35A90 into that slot (e.g., in a slot of bucket 0x5A, next to a slot holding the first entry for address 0x5AC0).

In some cases, when either 0x5AC0 or 0x35A90 arrive again, the GMT controller may use their pre-existing entries in bucket 0x5A and avoid creating a new entry upon any reoccurrence of either address. Once all of the space in bucket 0x5A is filled (e.g., all slots are filled), and the GMT controller receives another, different address that hashes to bucket 0x5A (e.g., bucket 614), the GMT controller may determine where to store that address. For example, the GMT controller may store this new address in a collision heap (e.g., collision heap 612), which may be linked to bucket 0x5A. As shown, when bucket 614 is filled, a GMT controller may store the additional address that hashes to bucket 614 to a bucket of a collision heap (e.g., to bucket 618 of collision heap 612). A chaining pointer may link bucket 614 to the bucket of the collision heap (e.g., chaining pointer 616 may point to bucket 618 of collision heap 612). Buckets in the collision heap may be allocated on an as-needed basis, as new addresses arrive and the bucket of the primary table they index to is filled. In some cases, when a new address arrives, the GMT controller may first check its indexed bucket in the primary table and if the GMT controller does not find a match for the address in that primary bucket, the GMT controller may check a bucket in a linked collision heap that is pointed at by a chaining pointer. It is noted that because a buckets in a collision heap may be allocated on-demand, an arriving address may not map directly to a bucket of the collision heap by address alone, but instead may be mapped indirectly by going through a chain that starts in the primary table.

It is noted that the CSRs of a primary table (e.g., CSR set 630 of primary table 608) may be semi-permanent. In between timesteps, a host (e.g., operating system, software) may re-structure a hash table (e.g., restructure primary table 608). In some cases, restructuring may include moving or resizing the primary table. In some cases, a host may overwrite the start pointer and/or end pointer of the primary table. In some cases, changes to a primary table and/or changes to CSRs of a primary table may be less frequent than changes to a collision heap and/or CSRs of a collision heap. In some cases, changes to a collision heap and/or CSRs of a collision heap may occur as new data arrives, for example.

In the illustrated example, active CSR set 648 may indicate that CSR set 640 is the active set of CSRs where data is currently being written to. Accordingly, primary start pointer 632 may remain pointing to bucket 614 to indicate bucket 614 is the start of the allocation of primary table 608. When one collision heap is filled up, the CSRs are changed to point to the next collision heap via active CSR set 648. In some cases, when a new address arrives, the address may be looked up first in primary table 608. The location of primary table 608 (e.g., of the start of allocation, end of allocation, etc.) may be maintained via a hash table manager, enabling a GMT controller to determine where to perform a first lookup regardless whichever set of CSRs is the active set of CSRs. Accordingly, primary start pointer 632 may remain pointing at bucket 614 during the course of the execution of an application, but may change when a hash table is restructured. Further details regarding active CSRs, inactive CSRs, indicating the active set of CSRs, selecting the active CSR set, etc., is provided with regards to FIG. 7.

As shown, one or more registers of CSR set 640 may indicate where a current location of a start of an allocation, where a next item of data is written based on a write pointer, and/or where a current location of an end of an allocation. For example, CSR set 640 may include a first status register (e.g., allocation start pointer 642) that points to bucket 628 of collision heap 612, indicating bucket 628 is the start of the active allocation where data is currently being written. Additionally, or alternatively, CSR set 640 may include a second status register (e.g., write pointer 644) that points to a bucket where a next write occurs (e.g., next empty bucket). Additionally, or alternatively, CSR set 640 may include a third status register (e.g., allocation end pointer 646) that points to bucket 638 (e.g., a last allocated bucket of collision heap 612), indicating bucket 638 is the end of the active allocation where data is currently being written. In some cases, a hash table manager (e.g., hash table manager 325) may manage CSR set 640.

During a timestep, additional space in a collision heap may be needed. New collision heap allocations may be created on-demand, and may be located anywhere in memory (e.g., in global shared memory). Hardware may signal management software (e.g., host, operating system, etc.) to allocate more collision heap space. For example, when the write pointer is at or near the end of the allocation. By tracking the bucket write pointer 644 is pointing to relative to the bucket allocation end pointer 646 is pointing to, a hash table manager may be configured to determine when collision heap 612 is full or is approaching being full, and determine when to add an additional collision heap. In some cases, a GMT controller (e.g., GMT controller 320, GMT controller 502, GMT controller 504, GMT controller 506) may determine when collision heap 612 is full or is approaching being full, and may signal to the hash table manager when new address is needed to create a new bucket.

In some cases, the GMT controller may create a new bucket and link the new bucket to a previous bucket.

In some examples, a host (e.g., software, operating system, application) may allocate a new contiguous region of memory. The host may set one or more registers (e.g., configuration status registers (CSRs)) to indicate to hardware a location of the new heap allocation. A write pointer can tell hardware where to create the next collision bucket. In some cases, hardware (e.g., a GMT controller) may write new buckets into a new allocation. In some cases, a hash table manager may create a new bucket (e.g., at a next empty bucket) and increment write pointer 644 after creating the new bucket. In some cases, a hash table manager may use allocation start pointer 642 for debugging.

As shown, buckets may be chained across heap allocations. However, in some cases, buckets may be prohibited from pointing backwards to older allocations. For example, collision heap 610 may be allocated after primary table 608, and collision heap 612 may be allocated after collision heap 610. Accordingly, a chaining pointer of a bucket of collision heap 612 may be prohibited from pointing to a bucket of collision heap 610 or a bucket of primary table 608.

Based on a hash collision, a GMT controller may traverse the collision chain looking for a matching key. If none is found when the end of the chain is reached, a new entry may be added to the existing bucket if there is space, or a new bucket may be added/created at the location indicated by the write pointer. When a new bucket is created, the hash table manager may write the chaining pointer of the previously last bucket (e.g., previously the last bucket of the heap until the new bucket is added) with the address of the new bucket. In some cases, new allocations may be zeroed out.

Figure 7:
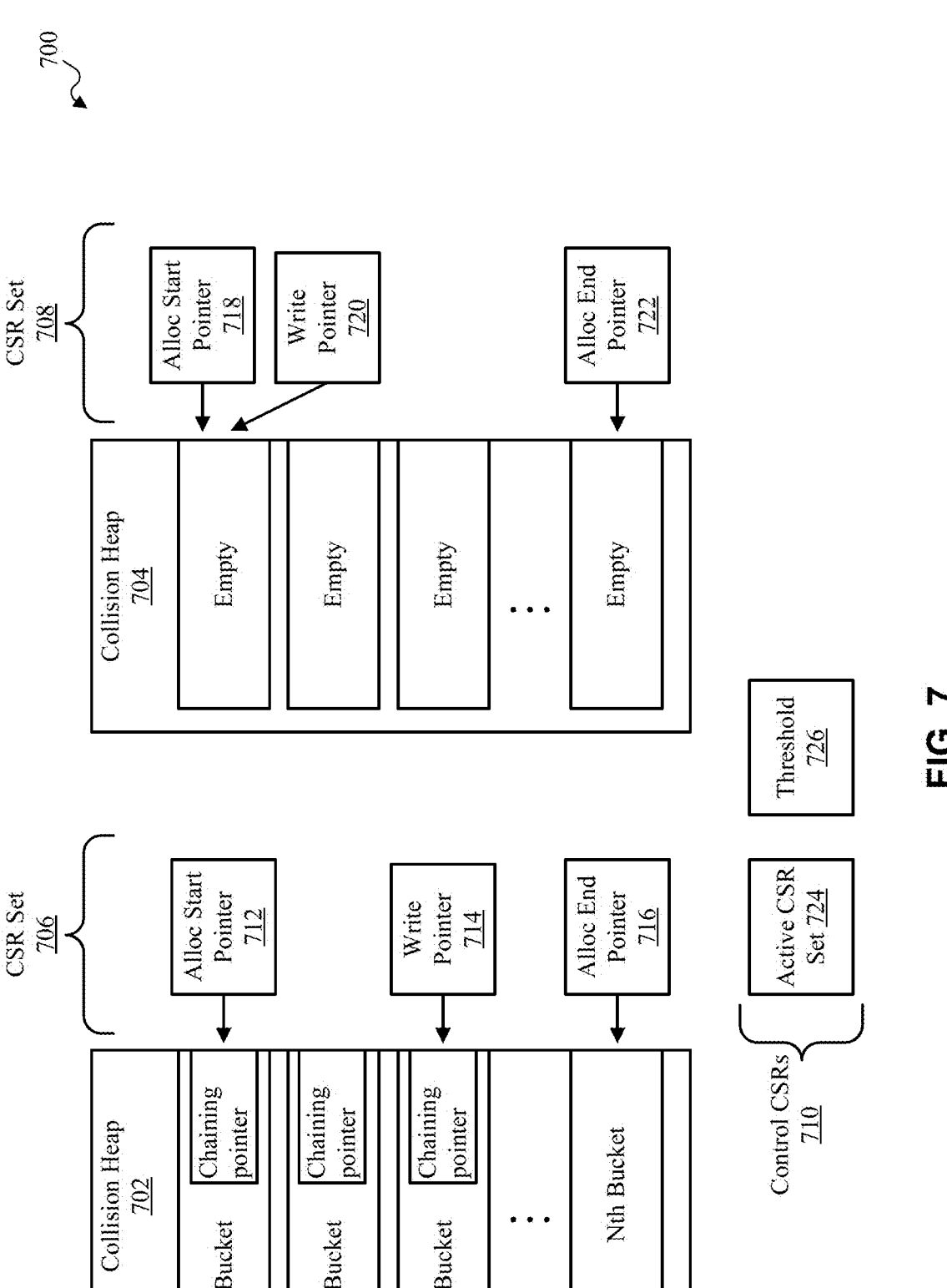
FIG. 7 illustrates an example tracking table in accordance with one or more implementations as described herein.

FIG. 7 illustrates an example tracking table 700 in accordance with one or more implementations as described herein. In some cases, tracking table 700 may enable a system of tracking table mechanisms for timestep shared memory multiprocessing. In some cases, tracking table 700 may be an example of tracking table 335, tracking table 400, and/or tracking table 600.

In the illustrated example, tracking table 700 may include collision heap 702, collision heap 704, CSR set 706, CSR set 708, and control CSRs 710. As shown, CSR set 706 may include allocation start pointer 712, write pointer 714, and allocation end pointer 716. CSR set 708 may include allocation start pointer 718, write pointer 720, and allocation end pointer 722. Control CSRs 710 may include active CSR set 724 and threshold 726. CSR set 706, CSR set 708, and/or control CSRs 710 may be part of a set of registers of an SoC (e.g., SoC 305. In some cases, the CSRs may be stored in registers of a hash table manager (e.g., CSR 340 of hash table manager 325).

Tracking table 700 may illustrate an early allocation optimization (e.g., providing a new allocation before an active allocation is filled). To conceal the latency of creating a new heap allocation, a host (e.g., operating system), a GMT controller (GMT controller 320), and/or a hash table manager (e.g., hash table manager 325) may request a new allocation before a write pointer reaches the end of a current heap allocation. In some implementations, the early allocation optimization may be based on a pair of CSR sets (e.g., CSR set 706 and CSR set 708) configured to track, respectively, a currently active allocation (e.g., collision heap 702) and a new allocation (e.g., collision heap 704) that is to be activated once the currently active allocation is filled. In some cases, hardware and software components of an SoC (e.g., SoC 305) may ping-pong between the two sets of CSRs.

In some examples, active CSR set 724 may indicate which CSR set is being actively used, or which CSR set is associated with the currently active allocation. For example, before collision heap 702 is filled, collision heap 702 may be the active allocation to which data is currently being written. Accordingly, active CSR set 724 may indicate CSR set 706 is the active CSR set. When the hash table manager determines collision heap 702 is filled, then the hash table manager may make collision heap 704 the active allocation. Accordingly, the hash table manager may update active CSR set 724 to indicate CSR set 708 is now the active CSR set.

In some examples, threshold 726 may be configured to indicate a threshold (e.g., fill threshold). In some cases, threshold 726 may trigger hash table manager to notify the host (e.g., operating system) to create a new allocation. For example, when a host, a GMT controller, and/or the hash table manager determines collision heap 702 satisfies threshold 726, then the host and/or the hash table manager may allocate space for collision heap 704. In some cases, the hash table manager may generate CSR set 708, initializing CSR set 708 so that allocation start pointer 718 and writer pointer 720 point to the first available bucket of collision heap 704, and allocation end pointer 722 points to the last bucket of collision heap 704. In some cases, threshold 726 may indicate a number of buckets before a last bucket of the currently active allocation (e.g., 20 buckets before the last bucket of the currently active allocation, 10 buckets before the last bucket of the currently active allocation, 8 buckets before the last bucket of the currently active allocation, 5 buckets before the last bucket of the currently active allocation, etc.). For example, with collision heap 702 being the currently active allocation and threshold 726 indicating N−8 buckets from the last bucket, the hash table manager may monitor the position of writer pointer 714 in relation to the N−8 indicator of threshold 726. When the hash table manager determines that write pointer 714 points to the N−8th bucket of collision heap 702 (e.g., the bucket indicated by threshold 726, 8 buckets before the last bucket of collision heap 702), the hash table manager may request the host to allocate collision heap 704.

Figure 8:
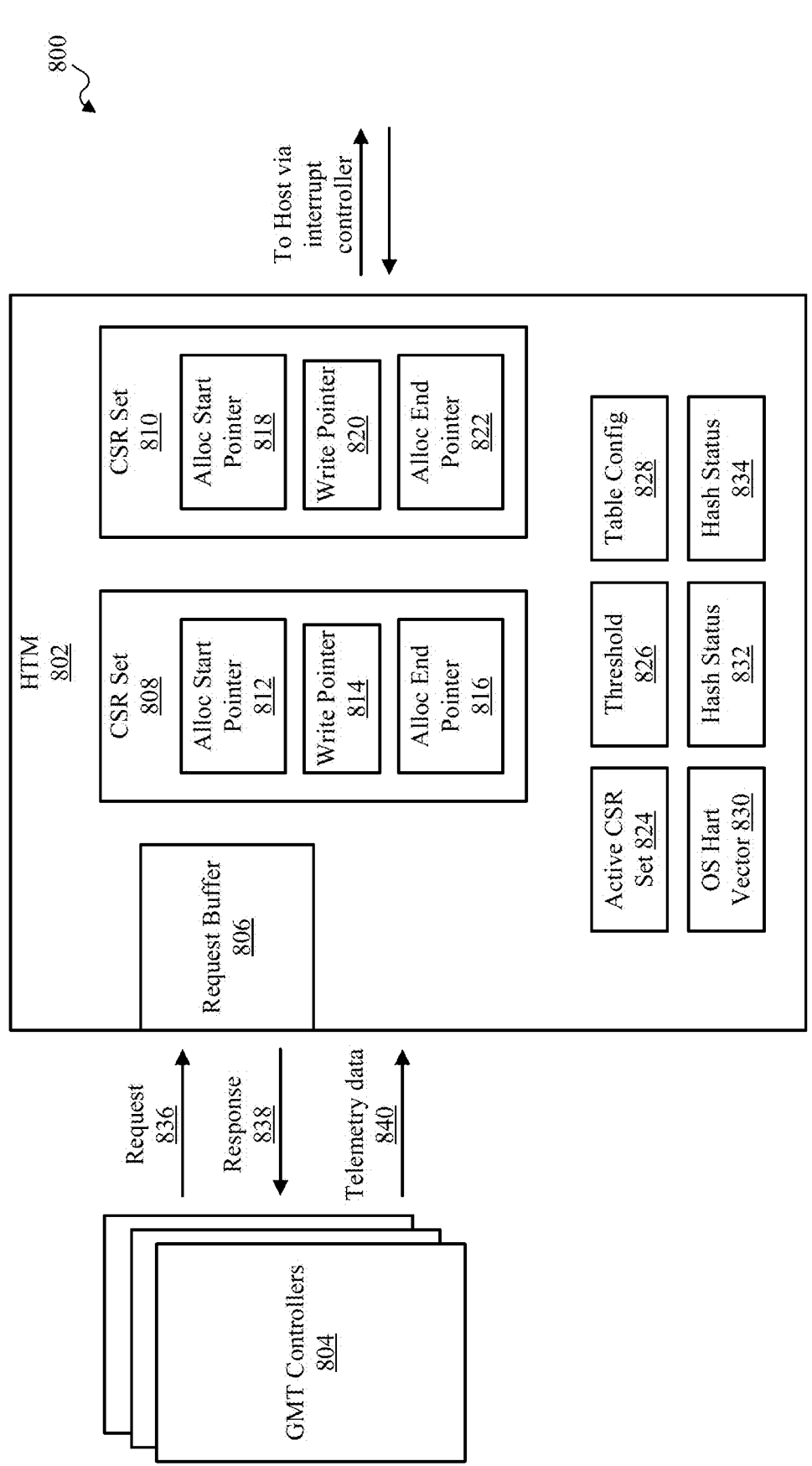
FIG. 8 illustrates an example system in accordance with one or more implementations as described herein.

FIG. 8 illustrates an example system 800 in accordance with one or more implementations as described herein. In some cases, system 800 may include a system of tracking table mechanisms for timestep shared memory multiprocessing. In the illustrated example, system 800 may include a hash table manager (HTM) 802 and one or more GMT controllers 804. As shown, HTM 802 may include request buffer 806, CSR set 808, CSR set 810, and one or more control CSRs. As shown, CSR set 808 may include allocation start pointer 812, write pointer 814, and allocation end pointer 816. CSR set 810 may include allocation start pointer 818, write pointer 820, and allocation end pointer 822. The one or more control CSRs may include at least one of active CSR set 824, threshold 826, table configuration 828, operating system (OS) hardware thread (hart) vector 830, hash status 832, and/or hash status 834. In some cases, hash status 832 may indicate a status of a hash table (e.g., active, inactive, etc.) associated with CSR set 808, and hash status 834 may indicate a status of a hash table associated with CSR set 808.

In some cases, HTM 802 may depict a central hash table manager (e.g., hardware widget, logical circuit, microcontroller). In some cases, HTM 802 may include at least one processing unit (e.g., CPU, FPGA, ASIC, microcontroller, etc.). In some cases, HTM 802 may include at least one memory module. In some examples, at least one of the one or more GMT controllers 804 may send a request 836 (e.g., request for tracking table information) to HTM 802. In some cases, request buffer 806 may buffer requests from the one or more GMT controllers 804. In some cases, HTM 802 may provide a response to at least one of the one or more GMT controllers 804. The response may include tracking table information, address stored in a bucket of a hash table, a node ID of node that wrote the application data, etc. As shown, at least one of the one or more GMT controllers 804 may provide telemetry data to HTM 802. In some cases, the telemetry data may indicate information regarding a hash table. In CSRs may be updated by hardware, read by software to determine whether to reconfigure the hash table between timesteps.

In some examples, telemetry data 840 may include number of collision buckets, maximum chain length, load factor (e.g., ratio of the number of used buckets in hash table to the number of bucket slots), and/or average bucket occupancy. In some cases, telemetry data 840 may include information related to resizing of the primary table, changing the bucket format, and/or the changing chaining structure. For example, when a chain becomes too long (e.g., the number of chains exceeds a chain number threshold, a time to traverse the chain exceeds a chain time threshold), a host may increase the size of the primary table and/or the associativity of the buckets. In some cases, a reconfiguration may discard previous (e.g., all previous) tracking entries. In some cases, a new primary table may be zeroed out.

In some cases, the one or more GMT controllers 804 may operate in parallel, while there may be one active write pointer for one active collision heap. An implementation may include implementing parallel heaps with their own write pointers that pre-defined sets of GMT controllers may utilize. In some cases, a write pointer of may be incremented when a new bucket is created (e.g., based on writing into the prior location indicated by the write pointer).

In one or more examples, the one or more GMT controllers 804 may be configured to fill multiple tracking entries into bucket. The one or more GMT controllers 804 may be configured to check keys (e.g., all keys) in a bucket for a match. In some cases, the one or more GMT controllers 804 may be configured to traverse chained buckets on hash collisions. The one or more GMT controllers 804 may be configured to signal to HTM 802 when a new address is needed to create a new bucket. The one or more GMT controllers 804 may be configured to create new buckets and link them. In some examples, at least one GMT controller of the one or more GMT controllers 804 may create a new bucket for its tracking entry while other GMT controllers may be writing into an existing bucket or tracking entry.

In some examples, at least one of the one or more GMT controllers 804 may signal to HTM 802 a request for an address to write a new bucket into. HTM 802 may respond with an address and automatically increment the write pointer. It is noted that the one or more GMT controllers 804 may interact directly with memory when accessing a hash table. In some cases, the one or more GMT controllers 804 may interact (e.g., only interact) with HTM 802 when a new address is being requested to write a new bucket.

In some cases, multiple GMT controllers can make a request to HTM 802 concurrently. HTM 802 may buffer the GMT controllers (e.g., if waiting for a new heap allocation) via request buffer 806. In some examples, a given GMT controller may have (e.g., only have) one request to HTM 802 outstanding at a time. The one or more GMT controllers 804 may communicate with HTM 802 using a dedicated interconnect (e.g., to minimize the possibility of deadlock), or via a general-purpose utility network. The systems and methods ensure that requests on the network cannot block the completion of a memory allocation operation by the host.

HTM 802 may be configured to maintain a single write pointer in a latest, current, or active collision heap allocation. In some cases, HTM 802 may be configured to maintain SoC-wide CSRs to track the current collision heap allocation for use by hardware (e.g., via an allocation start pointer, a write pointer, an allocation end pointer, etc.) HTM 802 may be configured to hold SoC-wide CSRs written by hardware, read by software. In some cases, HTM 802 may receive telemetry data 840 (e.g., hash table statistics) for evaluation to reconfigure the tracking table. Telemetry data 840 may indicate a load factor (e.g., ratio of used buckets in hash table to number of bucket slots), number of collision buckets, maximum chain length, etc. As shown, HTM 802 may be configured to receive requests from the one or more GMT controllers 804 and provide a response (e.g., new addresses). HTM 802 may be configured to communicate with the host (e.g., operating system) to allocate additional collision heap space.

In some implementations, HTM 802 may manage write pointer 814 and/or write pointer 820, manage one or more SoC-level CSRs (e.g., all SoC-level CSRs), and/or manage interactions with the host (e.g., operating system). When the write pointer is near or at the end of the current active allocation, HTM 802 may signal the host, via an interrupt, to allocate more memory. In some cases, HTM 802 may connect (e.g., directly connect) to an interrupt controller to vector to the correct hardware thread (hart). In some cases, the one or more GMT controllers 804 have no visibility into host interactions. In some cases, the one or more GMT controllers 804 may see (e.g., only see) delayed responses from HTM 802. In some cases, when stalls become too large (e.g., based on exceeding a stall threshold), separate heaps may be used to minimize the impact to system performance.

Figure 9:
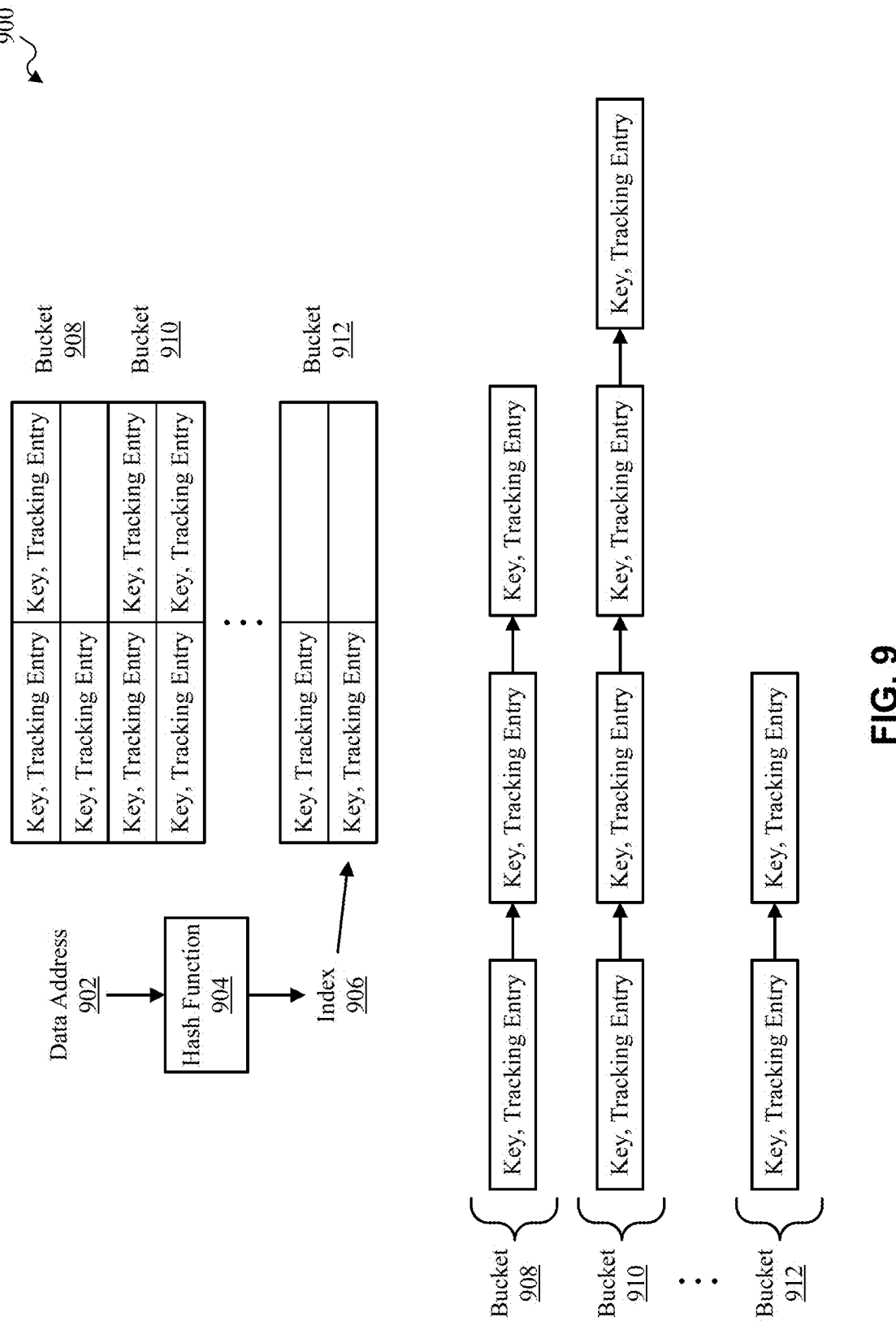
FIG. 9 illustrates an example tracking table in accordance with one or more implementations as described herein.

FIG. 9 illustrates an example tracking table 900 in accordance with one or more implementations as described herein. In some cases, tracking table 900 may enable a system of tracking table mechanisms for timestep shared memory multiprocessing. In some cases, tracking table 900 may be an example of tracking table 335, tracking table 400, tracking table 600, and/or tracking table 700. In some cases, tracking table 900 may illustrate a hybrid table (e.g., hybrid global memory tracking table (GMT)). In the illustrated example, tracking table 900 may include bucket 908, bucket 910, up to bucket 912. The illustrated buckets may be buckets of a hash table (e.g., primary table 408, collision heap 410, GMT slice 516-1 of a hash table, GMT slice 516-2 of a hash table, GMT slice 516-S of a hash table, primary table 608, collision heap 610, collision heap 611, collision heap 702, collision heap 704).

As shown, data address 902 may be input to hash function 904, generating index 906. In the illustrated example, bucket 908, bucket 910, and/or bucket 912 may include one or more key/tracking entry pairs, where each pair includes a key and a tracking entry. In a given key/tracking entry pair, the key may include the data address (e.g., data address 402) of a location in memory where a node writes application data, and the tracking entry may indicate the node that wrote the application data at that location in memory. In the illustrated example, bucket 908 may include three key/tracking entry pairs (e.g., linked based on chaining pointers); bucket 910 may include four key/tracking entry pairs (e.g., linked based on chaining pointers); and bucket 912 may include two key/tracking entry pairs (e.g., linked based on chaining pointers).

In some examples, a bucket (e.g., each bucket) may be a fully associative collection of entries. Some hash tables can have relatively long chains that increase latency. However, associative buckets of tracking table 900 minimizes chain length and latency. Based on the associative buckets, hardware (e.g., SoC 305, hash table manager 325, GMT controller 320, etc.) is enabled to check one or more keys in parallel (e.g., all keys of a given bucket in parallel).

Figure 10:
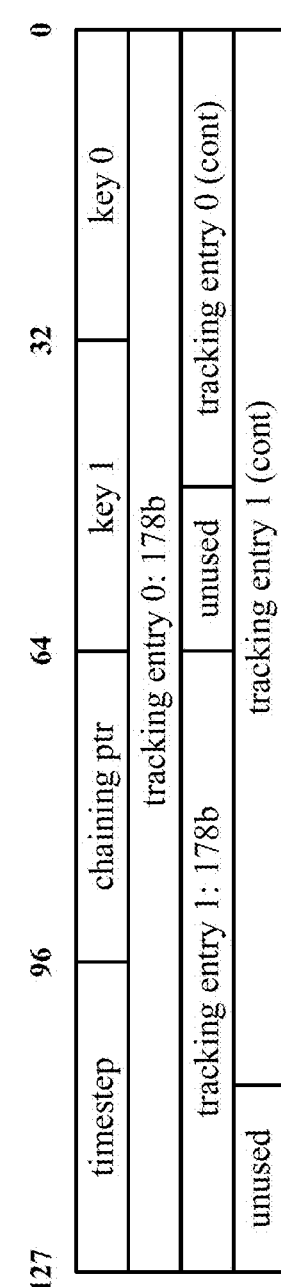
FIG. 10 illustrates an example data structure in accordance with one or more implementations as described herein.

FIG. 10 illustrates an example data structure 1000 in accordance with one or more implementations as described herein. In the illustrated example, data structure 1000 may depict the format of a bucket associated with a hash table. For example, data structure 1000 may illustrate a structure of a bucket of a hash table, primary table, collision heap, etc. As shown, data structure 1000 may include one or more fields that include at least one field of a first key (key 0), a second key (key 1), a chaining pointer, a timestep (e.g., a time interval, a time step repeat interval, and/or a reference time), a first tracking entry (tracking 0), or a second tracking entry (tracking entry 1).

Data structure 1000 provides an example of a size and layout of a data structure of a hash bucket among various sizes and layouts that may be configured and/or implemented. In some cases, hardware (e.g., SoC 305, hash table manager 325, GMT controller 320, etc.) may be configured to use one or more formats of varying size, varying groupings, varying layout, varying configuration, etc. Software (e.g., host, operating system, application) may reconfigure a bucket layout implemented in a given system between timesteps. In the illustrated example, data structure 1000 may depict the format of one bucket with one 64-byte memory block (e.g., two 178-bit tracking entries, byte aligned).

FIG. 11 illustrates an example data structure 1100 in accordance with one or more implementations as described herein. In the illustrated example, data structure 1100 may depict the format of a bucket associated with a hash table. For example, data structure 1100 may illustrate a structure of a bucket of a hash table, primary table, collision heap, etc. As shown, data structure 1100 may include one or more fields that include at least one field of a first key (key 0), a second key (key 1), a third key (key 2), a fourth key (key 3), a fifth key (key 4), a sixth key (key 5), a seventh key (key 6) a chaining pointer, a first tracking entry (tracking 0), a first timestep (e.g., a time interval, a time step repeat interval, and/or a reference time), a second tracking entry (tracking entry 1), a third tracking entry (tracking entry 2), a second timestep, a fourth tracking entry (tracking entry 3), a third timestep, a fifth tracking entry (tracking entry 4), a sixth tracking entry (tracking entry 5), or a seventh tracking entry (tracking entry 6), a fourth timestep.

In the illustrated example, data structure 1100 provides an example of a size and layout of a data structure of a hash bucket among various sizes and layouts that may be configured and/or implemented. In some cases, hardware (e.g., SoC 305, hash table manager 325, GMT controller 320, etc.) may be configured to use one or more formats of varying size, varying groupings, varying layout, varying configuration, etc. (e.g., use a format based on data structure 1000 and/or use a format based on data structure 1100). Software (e.g., host, operating system, application) may reconfigure a bucket layout implemented in a given system between timesteps. In the illustrated example, data structure 1100 may depict the format of one bucket with three 64-byte memory block (e.g., seven 160-bit tracking entries, based on the data in the fields of data structure 1100 being packed).

FIG. 12 depicts a flow diagram illustrating an example method 1200 associated with the disclosed systems, in accordance with example implementations described herein. In some configurations, method 1200 may be implemented by timestep controller 140 of FIG. 1 and/or timestep controller 230 of FIG. 2 (e.g., in conjunction with SoC 305, hash table manager 325, GMT controller 320). In some configurations, method 1200 may be implemented in conjunction with machine 105, components of machine 105, or any combination thereof. The depicted method 1200 is just one implementation and one or more operations of method 1200 may be rearranged, reordered, omitted, and/or otherwise modified such that other implementations are possible and contemplated.

At 1205, method 1200 may include determining a first node writes application data to a memory. For example, timestep controller 140 may determine a first node writes application data to a memory.

At 1210, method 1200 may include obtaining a data address of the memory associated with the application data. For example, timestep controller 140 may obtain a data address of the memory associated with the application data.

At 1215, method 1200 may include generating an index of the data address based on hashing the data address in a hash function. For example, timestep controller 140 may generate an index of the data address based on hashing the data address in a hash function.

At 1220, method 1200 may include generating a tracking entry based on the first node writing application data to the memory. For example, timestep controller 140 may generate a tracking entry based on the first node writing application data to the memory.

At 1225, method 1200 may include storing the index and the tracking entry in a bucket of a hash table. For example, timestep controller 140 may store the index and the tracking entry in a bucket of a hash table.

FIG. 13 depicts a flow diagram illustrating an example method 1300 associated with the disclosed systems, in accordance with example implementations described herein. In some configurations, method 1300 may be implemented by timestep controller 140 of FIG. 1 and/or timestep controller 230 of FIG. 2 (e.g., in conjunction with SoC 305, hash table manager 325, GMT controller 320). In some configurations, method 1300 may be implemented in conjunction with machine 105, components of machine 105, or any combination thereof. The depicted method 1300 is just one implementation and one or more operations of method 1300 may be rearranged, reordered, omitted, and/or otherwise modified such that other implementations are possible and contemplated.

At 1305, method 1300 may include determining a first node writes application data to a memory. For example, timestep controller 140 may determine a first node writes application data to a memory.

At 1310, method 1300 may include obtaining a data address of the memory associated with the application data. For example, timestep controller 140 may obtain a data address of the memory associated with the application data.

At 1315, method 1300 may include generating an index of the data address based on hashing the data address in a hash function. For example, timestep controller 140 may generate an index of the data address based on hashing the data address in a hash function.

At 1320, method 1300 may include generating a tracking entry based on the first node writing application data to the memory. For example, timestep controller 140 may generate a tracking entry based on the first node writing application data to the memory.

At 1325, method 1300 may include storing the index and the tracking entry in a bucket of a hash table. For example, timestep controller 140 may store the index and the tracking entry in a bucket of a hash table.

At 1330, method 1300 may include monitoring the application data based on a timestep, wherein the application data is written within a time period of the timestep. For example, timestep controller 140 may monitor the application data based on a timestep, wherein the application data is written within a time period of the timestep.

FIG. 14 depicts a flow diagram illustrating an example method 1400 associated with the disclosed systems, in accordance with example implementations described herein. In some configurations, method 1400 may be implemented by timestep controller 140 of FIG. 1 and/or timestep controller 230 of FIG. 2 (e.g., in conjunction with SoC 305, hash table manager 325, GMT controller 320). In some configurations, method 1400 may be implemented in conjunction with machine 105, components of machine 105, or any combination thereof. The depicted method 1400 is just one implementation and one or more operations of method 1400 may be rearranged, reordered, omitted, and/or otherwise modified such that other implementations are possible and contemplated.

At 1405, method 1400 may include determining a first node writes application data to a memory. For example, timestep controller 140 may determine a first node writes application data to a memory.

At 1410, method 1400 may include obtaining a data address of the memory associated with the application data. For example, timestep controller 140 may obtain a data address of the memory associated with the application data.

At 1415, method 1400 may include generating an index of the data address based on hashing the data address in a hash function. For example, timestep controller 140 may generate an index of the data address based on hashing the data address in a hash function.

At 1420, method 1400 may include generating a tracking entry based on the first node writing application data to the memory. For example, timestep controller 140 may generate a tracking entry based on the first node writing application data to the memory.

At 1425, method 1400 may include storing the index and the tracking entry in a bucket of a hash table. For example, timestep controller 140 may store the index and the tracking entry in a bucket of a hash table.

At 1430, method 1400 may include detecting an access violation to the application data based on the tracking entry indicating a node other than the first node modifies the application data. For example, timestep controller 140 may detect an access violation to the application data based on the tracking entry indicating a node other than the first node modifies the application data.

In the examples described herein, the configurations and operations are example configurations and operations, and may involve various additional configurations and operations not explicitly illustrated. In some examples, one or more aspects of the illustrated configurations and/or operations may be omitted. In some embodiments, one or more of the operations may be performed by components other than those illustrated herein. Additionally, or alternatively, the sequential and/or temporal order of the operations may be varied.

Certain embodiments may be implemented in one or a combination of hardware, firmware, and software. Other embodiments may be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The devices described herein may include wired devices, wireless devices, mobile devices, and/or stationary devices configured to communicate information as described herein.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to wired communication and/or a wireless communication, which may include transmitting the wired and/or wireless communication signals, and/or receiving the wired and/or the wireless communication signals. For example, a communication unit, which is capable of communicating wired and/or wireless communication signals, may include a wired transmitter and/or a wireless transmitter to transmit the communication signals to at least one other communication unit, and/or a wired and/or wireless communication receiver to receive the communication signal from at least one other communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other examples described herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method comprising:
   determining a first node writes application data to a memory;
   obtaining a data address of the memory associated with the application data;
   generating an index of the data address based on hashing the data address in a hash function;
   generating a tracking entry based on the first node writing application data to the memory;
   storing the index and the tracking entry in a bucket of a hash table; and
   detecting an access violation to the application data based on the tracking entry indicating a node other than the first node modifies the application data.

2. The method of claim 1, wherein the tracking entry includes an identifier of the first node, indicating the first node wrote the application data to the memory.

3. The method of claim 1, further comprising monitoring the application data based on a timestep, wherein the application data is written within a time period of the timestep.

4. The method of claim 3, further comprising detecting, based on the tracking entry, an access violation when a node other than the first node modifies the application data during the timestep.

5. The method of claim 1, wherein the application data comprises floating point data of a force, a velocity, an acceleration, or a position of an object.

6. The method of claim 1, wherein:

the memory is a memory of a system on chip (SoC), the SoC including the first node or a second node different from the first node, and the data address is obtained from a logical circuit of the SoC.

7. The method of claim 1, further comprising storing a write pointer to a first configuration status register, the write pointer pointing to a next available bucket of the hash table.

8. The method of claim 1, further comprising:

storing a start of allocation to a second configuration status register; and storing an end of allocation to a third configuration status register, wherein the start of allocation points to a starting bucket of the hash table and the end of allocation point to an ending bucket of the hash table.

9. The method of claim 1, further comprising adding a collision heap allocation based on determining a fill threshold of the hash table is satisfied.

10. The method of claim 9, further comprising:

identifying a collision associated with a second bucket of the hash table;

storing a second index and a second tracking entry in a bucket of the collision heap allocation; and linking the second bucket of the hash table to the bucket of the collision heap allocation.

11. A device comprising:

a memory; and at least one processor coupled with the memory configured to:

determine a first node writes application data to the memory;

obtain a data address of the memory associated with the application data;

generate an index of the data address based on hashing the data address in a hash function;

generate a tracking entry based on the first node writing application data to the memory;

store the index and the tracking entry in a bucket of a hash table; and detect an access violation to the application data based on the tracking entry indicating a node other than the first node modifies the application data.

12. The device of claim 11, wherein the tracking entry includes an identifier of the first node, indicating the first node wrote the application data to the memory.

13. The device of claim 11, wherein the at least one processor is configured to monitor the application data based on a timestep, wherein the application data is written within a time period of the timestep.

14. The device of claim 13, wherein the at least one processor is configured to detect, based on the tracking entry, an access violation when a node other than the first node modifies the application data during the timestep.

15. The device of claim 11, wherein the application data comprises floating point data of a force, a velocity, an acceleration, or a position of an object.

16. The device of claim 11, wherein:

the memory is a memory of a system on chip (SoC), the SoC including the first node or a second node different from the first node, and the data address is obtained from a logical circuit of the SoC.

17. The device of claim 11, wherein the at least one processor is configured to store a write pointer to a first configuration status register, the write pointer pointing to a next available bucket of the hash table.

18. A non-transitory computer-readable medium storing code that comprises instructions executable by a processor of a system on chip (SoC) to:

determine a first node writes application data to a memory;

obtain a data address of the memory associated with the application data;

generate an index of the data address based on hashing the data address in a hash function;

generate a tracking entry based on the first node writing application data to the memory;

store the index and the tracking entry in a bucket of a hash table; and detect an access violation to the application data based on the tracking entry indicating a node other than the first node modifies the application data.

19. The non-transitory computer-readable medium of claim 18, wherein the tracking entry includes an identifier of the first node, indicating the first node wrote the application data to the memory.

20. The non-transitory computer-readable medium of claim 18, wherein the code includes further instructions executable by the processor to cause the SoC to monitor the application data based on a timestep, wherein the application data is written within a time period of the timestep.

* * * * *